US009485045B2

(12) United States Patent
Maruyama et al.

(10) Patent No.: US 9,485,045 B2
(45) Date of Patent: Nov. 1, 2016

(54) COMMUNICATION CONTROL EQUIPMENT

(71) Applicant: Hitachi, Ltd., Tokyo (JP)

(72) Inventors: Tatsuya Maruyama, Tokyo (JP);
Tsutomu Yamada, Tokyo (JP);
Mitsuyasu Kido, Tokyo (JP); Shoji Yoshida, Tokyo (JP)

(73) Assignee: HITACHI, LTD., Tokyo (JP)

( * ) Notice: Subject to any disclaimer, the term of this patent is extended or adjusted under 35 U.S.C. 154(b) by 253 days.

(21) Appl. No.: 14/044,895

(22) Filed: Oct. 3, 2013

(65) Prior Publication Data
US 2014/0098706 A1  Apr. 10, 2014

(30) Foreign Application Priority Data
Oct. 9, 2012  (JP) ................. 2012-223904

(51) Int. Cl.
*H04J 3/06* (2006.01)
*H04L 12/835* (2013.01)

(52) U.S. Cl.
CPC ............ *H04J 3/0638* (2013.01); *H04J 3/0667* (2013.01); *H04L 47/30* (2013.01)

(58) Field of Classification Search
CPC ..... H04L 47/30; H04J 3/0638; H04J 3/0658; H04J 3/0667; H04J 3/0673; H04J 3/0679
See application file for complete search history.

(56) References Cited

U.S. PATENT DOCUMENTS

2008/0028467 A1* 1/2008 Kommareddy et al. ........ 726/23
2009/0290572 A1* 11/2009 Gonia et al. ................. 370/350
2010/0235486 A1* 9/2010 White et al. ................. 709/223
2011/0161524 A1* 6/2011 Na et al. ....................... 709/248
2011/0261917 A1* 10/2011 Bedrosian ..................... 375/371

(Continued)

FOREIGN PATENT DOCUMENTS

JP  2010-74600 A   4/2010
JP  2012-023654 A  2/2012

OTHER PUBLICATIONS

IEEE Standard for Precision Clock Synchronization Protocol for Networked Measurement and Control Systems, IEEE Std 1588, Jul. 24, 2008. 3 Park Avenue, New York, NY 10016-5997, USA.

(Continued)

*Primary Examiner* — Scott M Sciacca
(74) *Attorney, Agent, or Firm* — Baker Botts L.L.P.

(57) ABSTRACT

Communication control equipment is connected to a plurality of communication control equipment via a network and is configured to be time-synchronized with the plurality of communication control equipment by using a time synchronization procedure using a communication including at least request packets and acknowledgement packets. The communication control equipment includes a receiving-interval measurement section configured to measure a receiving interval of request packets from the plurality of communication control equipment; and a queuing-occurrence determination section configured to detect conflict of the request packets from any of the plurality of communication control equipment on a basis of the receiving interval of the request packets measured by the receiving-interval measurement section. The communication control equipment is configured to determine whether to transmit an acknowledgement packet to the communication control equipment that has transmitted the request packets based on a detection result of the queuing-occurrence determination section.

17 Claims, 20 Drawing Sheets

(56) References Cited

U.S. PATENT DOCUMENTS

| | | | |
|---|---|---|---|
| 2012/0275511 A1* | 11/2012 | Shemer et al. | 375/240.02 |
| 2012/0311168 A1* | 12/2012 | Dougan et al. | 709/230 |
| 2013/0077509 A1* | 3/2013 | Hirota | 370/252 |
| 2013/0121351 A1* | 5/2013 | Miyabe | 370/503 |

OTHER PUBLICATIONS

Office Action, mailed Feb. 2, 2016, which issued during the prosecution of Japanese Patent Application No. 2012-223904, which corresponds to the present application (English translation attached).

* cited by examiner

COMMUNICATION CONTROL EQUIPMENT

CLAIM OF PRIORITY

The present application claims priority from Japanese Patent Application JP 2012-223904 filed on Oct. 9, 2012, the content of which is hereby incorporated by reference into this application.

FIELD OF THE INVENTION

The present invention relates to communication control equipment used in a distributed control system.

BACKGROUND OF THE INVENTION

In a control system that includes distributed plural pieces of communication control equipment, time synchronization between the communication control equipment may be required in accordance with an application that realizes the control. In a distributed control system connected to a network, time synchronization is possible by transmission and reception of time synchronization packets via the network.

A time synchronization method using a network includes NTP (NetworkTime Protocol), SNTP (SimpleNetworkTime Protocol), IEEE 1588, etc.

Here, an execution procedure of a time synchronization protocol of IEEE 1588 is explained using FIG. 14 and FIG. 15. IEEE 1588 is applied to master-slave configurations.

FIG. 14 explains the execution procedure of the time synchronization protocol of IEEE 1588. FIG. 15 shows exchange of messages between a master and a slave in IEEE 1588.

First, a master transmits a Sync message to a slave (S060).

At this time, the master records a transmission time t1 of the Sync message (S061).

Upon receiving the Sync message, the slave records a reception time t2 thereof (S062).

The master notifies the transmission time t1 of the Sync message to the slave by use of any of the following methods (S063). In one of the methods, information on the transmission time t1 is placed on the Sync message. In another method, information on the transmission time t1 is placed on a Follow_Up message following the Sync message.

Then, the slave transmits a Delay_Req message to the master (S064).

At this time, the slave records a transmission time t3 of the Delay_Req message (S065).

Upon receiving the Delay_Req message, the master records a reception time t4 thereof (S066).

The master places information on the reception time t4 of the Delay_Req message on a Delay_Resp message and notifies the slave of the reception time t4 (S067).

The slave that has received the Delay_Resp message calculates a communication delay and a time difference between the master and slave from the times t1, t2, t3, and t4 (S068).

The calculation of communication delays is executed on the premise that the forward communication delay and backward communication delay are equal to one another between the master and slave. Therefore, a one-way communication delay td is expressed by Formula (1).

$$td=((t4-t3)+(t2-t1))/2 \qquad (1)$$

A time difference tdiff between the master and slave is expressed by Formula (2).

$$tdiff=((t4-t3)-(t2-t1))/2 \qquad (2)$$

The slave is time-synchronized with the master by use of the tdiff.

When the network includes intermediary equipment such as a network switch, a precision of the time synchronization will decrease. IEEE 1588 is based on the premise that a forward delay and backward delay of a time synchronization packet are equal to one another or that, even when there is a time difference between the delays, the time difference is well known.

When a network is shared by plural pieces of communication control equipment as in a distributed control system, time synchronization packets are queued within intermediary equipment such as a network switch, jitters occur in a time difference between the forward and backward delays. That is, since the forward and backward delays of a time synchronization packet differs from one another and a time difference between the forward and backward delays is unknown, the premise of IEEE 1588 collapses.

In IEEE 1588-2008, "IEEE Standard for a Precision Clock Synchronization Protocol for Networked Measurement and Control Systems," a transfer delay of a packet within a network device can be measured by use of an end-to-end TC (Transparent Clock) or peer-to-peer TC. By reflecting this measured transfer delay in data in the packet, it is possible to calculate a difference between the forward and backward communication delays. However, to use these methods, a network device corresponding to the end-to-end TC or peer-to-peer TC may be required. Such a network device is high in cost and does not become widespread comparing to general network devices, so they are difficult to obtain, and thus difficult to use.

In JP-A No. 2010-74600, plural delay estimation packets are transmitted at a predetermined transmission interval, reception intervals and predetermined transmission intervals are compared to estimate a queuing delay in a network device. However, in this method, since a time synchronization protocol is executed in both a master and a slave, communication control equipment compliant with a standard cannot be used in both the master and slave. Therefore, it is difficult to configure a system using communication control equipment compliant with the standard. Additionally, since a delay estimation packet is transmitted, an amount of transmission and reception of packets other than time synchronization packets are small. Accordingly, an amount of information transmitted and received in the system is small.

It is desirable to provide communication control equipment that is useful for a network configuration using general network intermediary equipment and that is able to time synchronize with other communication control equipment connected by a network without reducing an amount of information transmitted and received in a system.

SUMMARY OF THE INVENTION

For addressing the above-mentioned disadvantage, communication control equipment of the present invention has the following characteristics. The communication control equipment of the present invention is connected to a plurality of communication control equipment via a network and is configured to be time-synchronized with the plurality of communication control equipment by using a time synchronization procedure using a communication including at least request packets and acknowledgement packets. The communication control equipment comprises a receiving-interval measurement section configured to measure a receiving interval of request packets from the plurality of communication control equipment; and a queuing-occurrence determination section configured to detect conflict of the request packets from any of the plurality of communication control equipment on a basis of the receiving interval of the request packets measured by the receiving-interval measurement section. The communication control equipment is configured to determine whether to transmit an acknowledgement packet to the communication control equipment that has transmitted the request packets based on a detection result of the queuing-occurrence determination section.

The communication control equipment of the present invention is useful in a network configuration using network intermediary equipment, and is able to time synchronize with other communication control equipment connected by a network without reducing an amount of information transmitted and received in the system.

DETAILED DESCRIPTION OF THE PREFERRED EMBODIMENTS

Communication control equipment according to embodiments of the present invention is explained using the drawings. The communication control equipment of the present invention is included in a distributed control system and is connected to other communication control equipment via network intermediary equipment. In the following embodiments, other communication control equipment is expedientially called a "communication unit" to distinguish the interested communication control equipment from other communication control equipment. When a master-slave configuration is adopted as in IEEE 1588, the communication control equipment serves as a master and the communication unit serves as a slave. When a server-client configuration is adopted as in NTP, the communication control equipment serves as a server and the communication unit serves as a client. The communication control equipment of the present invention can be a master and a slave in a master-slave configuration and can be a server and a client in a server-client configuration.

The communication control equipment of the present invention is time-synchronized with other communication control equipment by use of a time synchronization procedure using a communication that includes at least request packets and acknowledgement packets. In the time synchronization, conflict of request packets from other communication control equipment is detected, and it is determined whether to transmit an acknowledgement packet to the communication control equipment that has transmitted the request packets on the basis of the detection result.

In the explanation of the following embodiments, IEEE 1588 is executed as a time synchronization protocol. In the time synchronization of a slave with a master in the following embodiments, a Delay_Req message of IEEE 1588 is a message for a slave to request a master to execute a time synchronization, and a Delay_Resp message is a message for a master to acknowledge a slave. Therefore, a packet of the Delay_Req message serves as a request packet, and a packet of the Delay_Resp message serves as an acknowledgement packet. A packet of a Sync message is a request packet for a time synchronization, i.e., a re-request packet.

In the present invention, NTP or SNTP may be executed as a time synchronization protocol. For example, in executing NTP or SNTP, a server acknowledges a request from a client. That is, the client transmits a request packet to the server and the server transmits an acknowledgement packet to the client.

Embodiment 1

Figure 1:
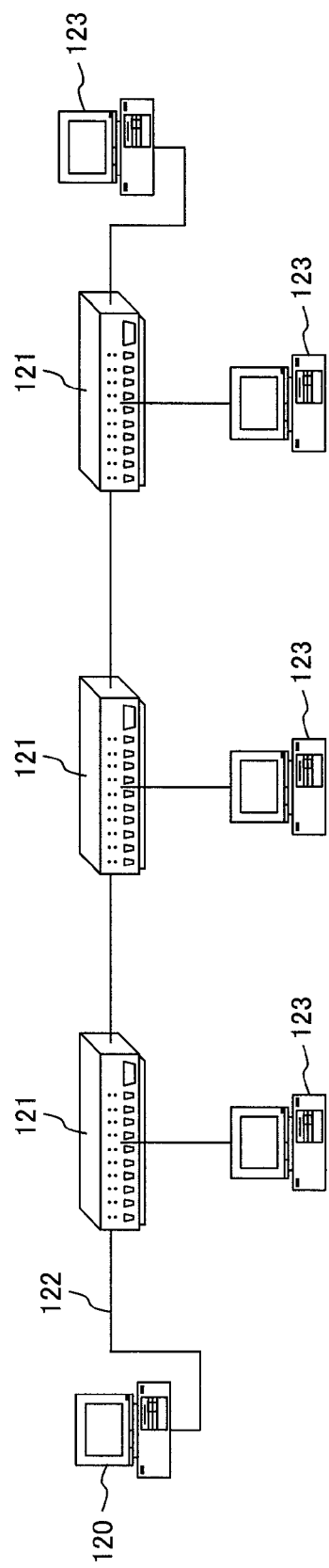
FIG. 1 shows an example of a distributed control system configured using communication control equipment of an embodiment of the present invention.

FIG. 1 shows an example of a distributed control system configured using communication control equipment 120 of this embodiment. The distributed control system includes the communication control equipment 120, communication units 123, a network 122, and network intermediary equipment 121. The communication control equipment 120 and communication units 123 and the communication units 123 themselves are connected to and communicate with each other via the network 122 and network intermediary equipment 121.

Examples of the network intermediary equipment 121 include a network switch, a router, a gateway, an OpenFlow switch in OpenFlow, etc. Examples of the network 122 include IEEE 802.3, various industrial networks, IEC 61784, IEC 61158, etc.

Figure 2:
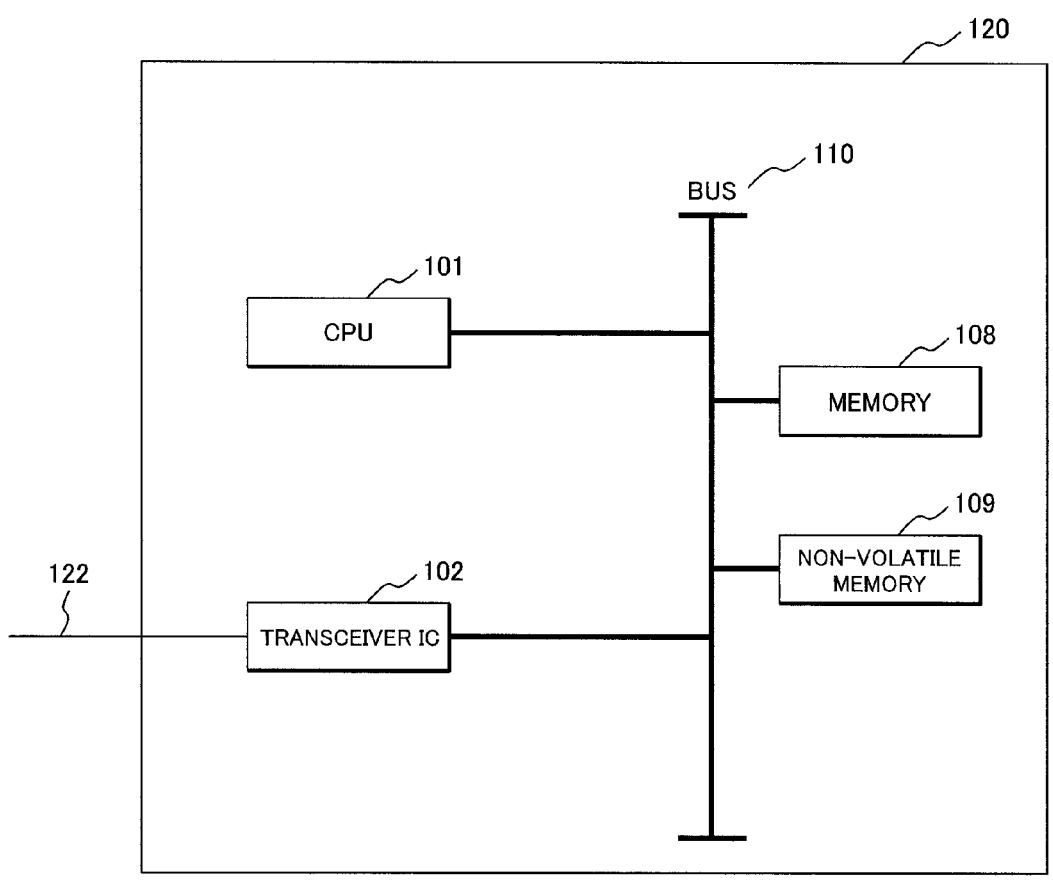
FIG. 2 shows a hardware configuration of the communication control equipment of an embodiment of the present invention.

FIG. 2 shows a hardware configuration of the communication control equipment 120 of this embodiment. The communication control equipment 120 is provided with a CPU 101, a transceiver IC 102, a memory 108, a non-volatile memory 109, and a bus 110.

The CPU 101 transfers a program from the non-volatile memory 109 to the memory 108 and executes this program. Programs to be executed include an operating system (hereinafter called "OS") and an application program that operates on an OS.

The transceiver IC 102 has a function of communication with the network 122. The transceiver IC 102 receives a communication request from a program executed by the CPU 101 and communicates with the network 122. An example of the transceiver IC 102 includes an IC such as a MAC (Media Access Control) chip of IEEE 802.3 standard, a PHY (physical layer) chip, a multi-chip of MAC and PHY, FPGA, CPLD, ASIC, and a gate array. The transceiver IC 102 may be contained in the CPU 101 or a chip set that controls an information route inside a computer.

The memory 108 is a temporary storage region to operate the CPU 101, and stores, e.g., an OS and application programs transmitted from the non-volatile memory 109.

The Non-volatile memory 109 is a memory for information to store an OS, application programs, device drivers, a program for operating the CPU 101, and additionally execution results of the programs. Examples of the non-volatile memory 109 include a hard disk drive (HDD), a solid-state drive (SSD), and a flash memory. An easily-detachable external storage may be used as the non-volatile memory 109. As such an external storage, a flexible disk (FD), an optical disk such as CD and DVD, and a flash memory such as a USB memory and a compact flash (registered trademark) can be used, for example.

The bus 110 connects the CPU 101, transceiver IC 102, memory 108, and non-volatile memory 109. Examples of the bus 110 include PCI bus, an ISA bus, a PCI Express bus, a system bus, and a memory bus.

[Explanation of Each Function of Communication Control Equipment]

Figure 3:
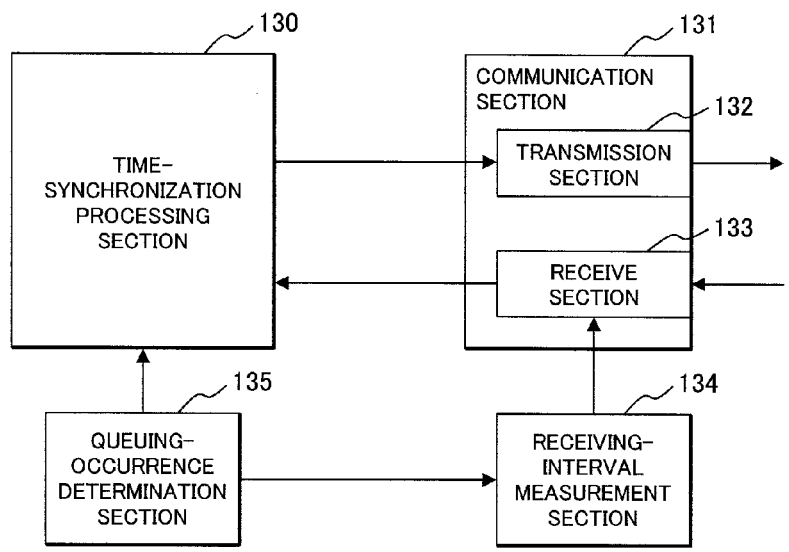
FIG. 3 shows a functional configuration of communication control equipment of Embodiment 1.

FIG. 3 shows a functional configuration of the communication control equipment 120 of Embodiment 1 of the present invention. The communication control equipment 120 is provided with a time-synchronization processing section 130, a communication section 131, a receiving-interval measurement section 134, and a queuing-occurrence determination section 135.

The time-synchronization processing section 130 executes time synchronization. Examples of the time synchronization protocol to be performed include IEEE 1588, NTP, and SNTP. As mentioned above, in explanation of this embodiment, IEEE 1588 is executed as the time synchronization protocol. However, NTP or SNTP also may be executed as the time synchronization protocol.

The time-synchronization processing section 130 may be realized by software executed by the CPU 101 or realized as a hardware logic when the transceiver IC 102 is configured using FPGA or CPLD. Alternatively, the time-synchronization processing section 130 may be configured using both software performed by the CPU 101 and a hardware logic of the transceiver IC 102. In this case, for example, measurement of a transmission time and reception time of a packet or generation of a packet format can be processed in the transceiver IC 102.

The communication section 131 has a transmission section 132 and a receive section 133 and transmits and receives predetermined packets in the time synchronization protocol. The transmission section 132 transmits the predetermined packets in the time synchronization protocol. The receive section 133 receives the predetermined packets in the time synchronization protocol. The communication section 131, transmission section 132, and receive section 133 can illustrate realization by the transceiver IC 102.

The receiving-interval measurement section 134 measures receiving intervals of packets received in the receive section 133 of the communication section 131. To measure the receiving intervals, the receiving-interval measurement section 134 has a function that measures a time of reception of a packet by the receive section 133. The receiving intervals of packets may be measured by calculating a difference between reception times of two any packets received consecutively by the receive section 133. When conforming to the standard of IEEE 1588, a receiving interval of packets may be measured by calculating a difference between reception times of two time synchronization packets (for example, Delay_Req message) received by the receive section 133.

The receiving-interval measurement section 134 may be realized by software performed by the CPU 101 or as hardware in the transceiver IC 102. Alternatively, the receiving-interval measurement section 134 may be realized by the combination of the software executed by the CPU 101 and the transceiver IC 102. In this case, for example, the transceiver IC 102 may measure reception times of packets, and the software performed by the CPU 101 may determine a difference between the reception times to calculate a receiving interval. In this case, the transceiver IC 102 discloses information for calculating the receiving interval to the CPU 101. This information may be maintained using a register of the transceiver IC 102, and the transceiver IC 102 may write the information in a predetermined region of the memory 108.

The queuing-occurrence determination section 135 determines whether a time synchronization packet is queued in a packet buffer in the network intermediary equipment 121. Hereinafter, occurrence of await time due to queuing of packets in the buffer in the network intermediary equipment 121 is called "conflict."

It is determined whether packets conflict from a comparison between a receiving interval T of actual packets measured in the receiving-interval measurement section 134 and a receiving interval Tr calculated using one or more of a communication processing time Tp of a packet, an inter-frame gap IFG, and a communication processing time Ts of the network intermediary equipment 121. The receiving interval Tr is calculated from a packet size and an equipment configuration.

The communication processing time Tp of any packet is determined by Formula (3).

$$Tp = Sp \times 8 \text{ [bit/byte]} / Th \quad (3)$$

Here, Sp is a packet size (expressed in the unit "byte") and Th is a communication throughput. For example, the communication processing time Tp at the time of transmitting a packet of 64 byte on the network of IEEE 802.3 standard of 100 Mbps is determined by Tp=64 [byte]×8 [bit/byte]/100 [Mbps]=5.12[μs].

The inter-frame gap IFG is a packet interval defined on the network. IEEE 802.3 standard defines an interval from transmission of a frame onto a communication route to transmission of a following frame as an inter-frame gap (Inter frame Gap, IFG). The inter-frame gap is defined as 96 bit time, and the inter-frame gap IFG can be determined by Formula (4).

$$IFG=96 \text{ [bit]}/Th \quad (4)$$

For example, on the network of IEEE 802.3 standard of 100 Mbps, IFG=96 [bit]/100 [Mbps]=0.96[μs].

The processing time Ts of the network intermediary equipment 121 depends on a content of processing of each piece of network intermediary equipment 121. The content of processing of the network intermediary equipment 121 includes extraction of destination port information and forward processing of packets in the network intermediary equipment 121. The processing time Ts of the network intermediary equipment 121 may use a value indicated in a data sheet and manual of the network intermediary equipment 121, and may use a value determined by measuring a forwarding delay of the network intermediary equipment 121 experimentally.

As an example of a method to measure a forwarding delay of the network intermediary equipment 121 experimentally, two communication ports are provided in a certain communication terminal, a test packet is transmitted from one communication port and then received by another communication port via the network intermediary equipment 121. A communication delay at this time (for example, a time of reception of a start of a packet minus a time of transmission of a top of the following packet) minus the communication processing time Tp of the packet by Formula (3) is the processing time Ts of the network intermediary equipment 121.

The communication processing time Ts of the network intermediary equipment 121 may change depending on a processing portion proportional to a packet size, whether a packet is present before and after a concerned packet, and an amount of information on a managed communication route. Therefore, estimation is necessary using various conditions. An example of a method to estimate the processing time Ts of the network intermediary equipment 121 is shown in Formula (5).

$$Ts=A+kSp+B+mC \quad (5)$$

A shows a fixed delay for packet forwarding, and k is a proportional factor to the packet size Sp. B shows a delay in case a packet is present before a concerned packet in the packet buffer of the network intermediary equipment 121. C is an amount of information on a communication route, and m is a proportional factor to the information amount C.

When plural pieces of the network intermediary equipment 121 are present between the communication control equipment 120 and communication units 123, the processing time Ts uses Ts of the network intermediary equipment 121 next to the communication control equipment 120 and a total value or the maximum of Ts of the network intermediary equipment 121 on the communication route, for example.

Figure 4:
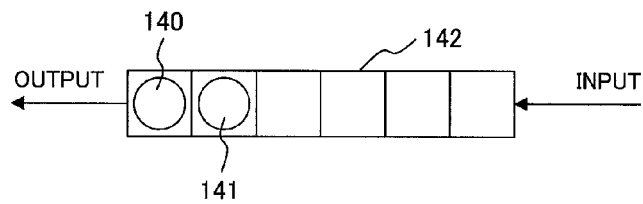
FIG. 4 shows the action when packets conflict in network intermediary equipment.

FIG. 4 shows the action when packets conflict in the network intermediary equipment 121. A buffer 142 is one for packets in the network intermediary equipment 121. The buffer 142 uses a First-in First-out (FIFO) type data structure. Now, it is assumed that a packet 140 is being transmitted and a packet 141 following the packet 140 is queued in the buffer 142. At this time, the packet 141 is delayed in transmission and has a wait time due to the preceding packet 140 in the buffer 142. That is, the packet 141 conflicts with the packet 140 in the buffer 142.

At this time, it is assumed that the communication control equipment 120 is connected with the output side shown in FIG. 4. From a receiving interval between the packet 140 and packet 141 in the communication control equipment 120, it can be determined that the packet 141 has conflicted with the packet 140. That is, when the packet 141 and packet 140 conflict with one another, the processing for the communication control equipment 120 to receive the packet 141 is delayed by a communication processing time of the packet 140.

When it is determined that conflict has occurred from a reception time of the start of the packet, the receiving interval Tr between the packet 140 and packet 141 is determined by Formula (6).

$$Tr=Tp+IFG+Ts \quad (6)$$

The communication processing time Tp of the packet is determined by Formula (3). The inter-frame gap IFG is determined by Formula (4). The processing time Ts of the network intermediary equipment 121 is determined by Formula (5).

Alternatively, the receiving interval Tr between the packet 140 and packet 141 may be determined by Formula (7) without the processing time Ts of the network intermediary equipment 121. The processing time Ts of the network intermediary equipment 121 is omissible in accordance with the configuration of the network intermediary equipment 121.

$$Tr=Tp+IFG \quad (7)$$

Alternatively, when it is determined that conflict has occurred by use of a reception time of the end of the packet and a reception time of the start of the following packet, the receiving interval Tr between the packet 140 and packet 141 is determined by Formula (8) or Formula (9).

$$Tr=IFG+Ts \quad (8)$$

$$Tr=IFG \quad (9)$$

In Formula (9), the processing time Ts of the network intermediary equipment 121 is omitted.

When the packet 141 conflicts with the packet 140, the amount of the packets on the network is large, and reception intervals of the packets are short. In case of no conflict, the amount of the packets is small, and the reception intervals of the packets are long. Therefore, when the packet 141 does not conflict with the packet 140, the actual receiving interval T of the packets should be longer than the receiving interval Tr determined by Formula (6), Formula (7), Formula (8), or Formula (9). Therefore, when a margin (degree of margin) is set as a and the actual receiving interval T satisfies Formula (10), it is determined that the packet 141 have not conflicted.

$$T>Tr+\alpha \quad (10)$$

The margin α can be any value (positive numerical value or zero) and is predefined.

[Functional Configuration of Communication Unit]

Figure 5:
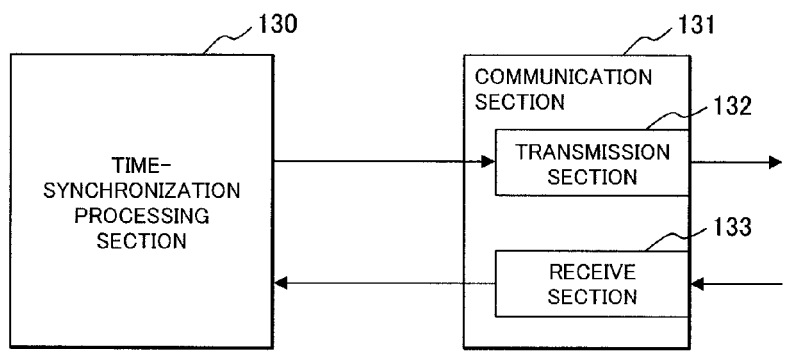
FIG. 5 shows a functional configuration of a communication unit in Embodiment 1.

FIG. 5 shows a functional configuration of each of the communication units 123 of this embodiment. Each of the communication units 123 is provided with the time-synchronization processing section 130 and communication section 131.

The time-synchronization processing section 130 executes a time synchronization protocol with the communication control equipment 120 and time synchronizes the communication unit 123 with the communication control equipment 120. NTP, SNTP, or IEEE 1588 can be used as the time synchronization method. In the master-slave configuration as in IEEE 1588, the communication control equipment 120 serves as a master and the communication unit 123 serves as a slave.

Figure 14:
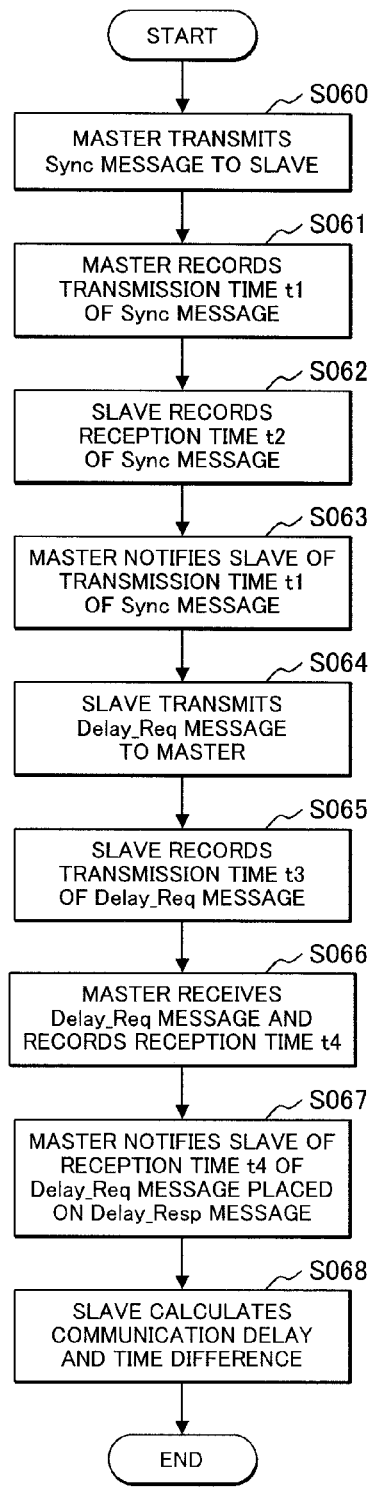
FIG. 14 shows a procedure of executing a time synchronization protocol of IEEE 1588.

The time-synchronization processing section 130 of the communication unit 123, which is a slave, calculates the communication delay td and the time difference tdiff between the master and slave by Formula (1) and Formula (2) respectively after reception of the Delay_Resp message (S068 of FIG. 14). Upon reception of the Sync message or Follow_Up message, on the basis of the communication delay td and time difference tdiff between the master and slave, the time-synchronization processing section 130 synchronizes the communication unit 123 with the communication control equipment 120 in time.

The communication section 131 has the transmission section 132 and the receive section 133 and transmits and receives predetermined packets in the time synchronization protocol. Since the functions of the transmission section 132 and receive section 133 are the same as those of the communication section 131 of the communication control equipment 120, their explanation is omitted.

Figure 6:
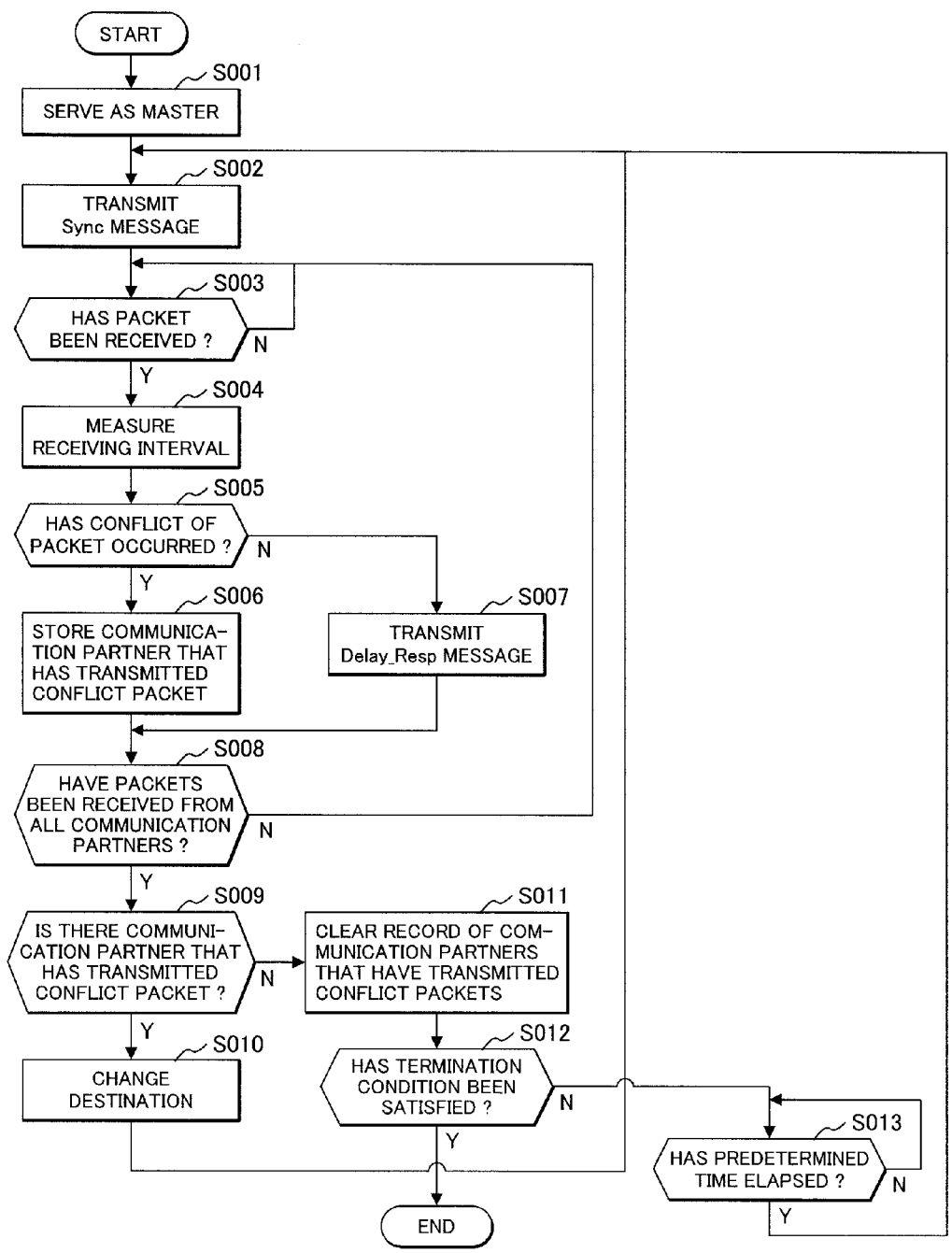
FIG. 6 shows a procedure of time synchronization processing of the communication control equipment of Embodiment 1.

FIG. 6 explains a procedure of the time synchronization of the communication control equipment 120. Since IEEE 1588 is executed as the time synchronization protocol in this embodiment as mentioned above, operation of the communication control equipment 120 in executing the IEEE 1588 protocol is shown in FIG. 6. In this embodiment, as mentioned above, the communication control equipment 120 serves as a master in the IEEE 1588 protocol.

First, the communication control equipment 120 serves as a master of the IEEE 1588 (S001). In IEEE 1588, in accordance with a Best Master Clock (hereafter called "BMC") algorithm, information (Announce message) is exchanged between the communication control equipment 120 and each of the communication units 123, and it is determined whether to serve as a slave or a master in accordance with contents of this information. In this embodiment, parameters of the communication control equipment 120 and each of the communication units 123 are previously set so that the communication control equipment 120 serves as a master. For example, a method of making the communication control equipment 120 serve as a master includes a method of increasing a priority of information on exchange of Announce messages to make the communication control equipment 120 serve as a master.

Alternatively, the configuration of the communication unit 123 may be made to be the same as that of the communication control equipment 120 without particularly setting the parameters in the BMC algorithm. In this case, for convenience, as a result of executing the BMC algorithm, the unit serving as a master is the communication control equipment 120, and the unit serving as a slave is the communication unit 123.

Next, the time-synchronization processing section 130 transmits the Sync message to the communication unit 123 by a multicast in accordance with the protocol of IEEE 1588 (S002). In the specification of IEEE 1588, a two step mode that transmits the Follow_Up message after transmission of the Sync message is defined. This embodiment is explained on the premise of the one step mode that transmits only the Sync messages, but an advantageous effect of this embodiment is acquired even in the two step mode as in the one step mode.

Next, the time-synchronization processing section 130 waits for reception of a packet (Delay_Req message) (S003).

Upon reception of the Delay_Req message, the receiving-interval measurement section 134 of the communication control equipment 120 measures a receiving interval between the Delay_Req message and a most recently received packet (S004). When the Delay_Req message is the first received packet, the receiving interval between the Delay_Req message and the most recently received packet cannot be measured. Therefore, in this case, the receiving interval is set to 0, and the queuing-occurrence determination section 135 determines that no conflict has occurred.

Next, the queuing-occurrence determination section 135 of the communication control equipment 120 determines whether the conflict of the packets has occurred (S005).

When it is determined that the conflict of the packet has occurred in S005, the time-synchronization processing section 130 of the communication control equipment 120 stores a communication partner that has transmitted the conflict packet in the memory 108 (S006). The communication partner is stored with an IP address or MAC address or an identifier (a clock identifier, a domain, etc.) identifiable on IEEE 1588, for example.

When it is determined that the conflict of the packets has not occurred in S005, the time-synchronization processing section 130 transmits the Delay_Resp message and continues the time synchronization protocol (S007).

The time-synchronization processing section 130 determines whether packets have been received from all the communication partners after S006 or S007 (S008). When the packets have not been received from all the communication partners, reception of a packet (Delay_Reg message) is waited at S003.

When it is determined that packets have been received from all the communication partners at S008, the time-synchronization processing section 130 determines whether there is a communication partner that has transmitted the conflict packet (S009) (there is the communication partner stored in S006). In consideration of occurrence of packet loss on the way, when a predetermined time has elapsed without receiving a packet, the process may proceeds to S010 from S008. If a predetermined time is 0, this means re-execution of time synchronization is conducted at the time of determining a conflict without waiting of all packets received.

When there is a communication partner that has transmitted a conflict packet at S009, a delay has occurred due to queuing in the network intermediary equipment 121. In this case, the communication control equipment 120 re-executes the time synchronization protocol procedure.

When a multicast message is transmitted at this time as well as the first transmitted Sync message, all the communication units 123 reply again. This is not desirable because the packets may conflict within the network intermediary equipment 121 again. Therefore, it is necessary to communicate only with the communication partner determined to have transmitted a conflicted packet. Examples of the method of realizing this communication include a unicast communication that communicates only with specific communication partners, a communication that defines and uses a different multicast address, and a communication that uses grouping by VLAN by use of the network intermediary equipment 121 corresponding to VLAN functions.

The time-synchronization processing section 130 changes a destination of a communication partner to communicate only with the communication partner determined to have transmit a conflict packet by use of any of those communication methods (S010). Then, the time-synchronization processing section 130 again transmits the Sync message to the communication partner determined to have transmitted the conflict packet, and re-executes the time synchronization protocol (S002).

When there is no communication partner that has transmitted a conflict packet at S009, the time-synchronization processing section 130 clears a record of the communication partners that have transmitted conflict packets (S011).

Next, the time-synchronization processing section 130 determines whether a termination condition has been satisfied (S012). The termination condition may be satisfied by an explicit instruction of a user or a system manager or may be set using an elapsed time after the start of the system or the number of executions of the time synchronization protocol. When the termination condition has been satisfied, the communication control equipment 120 terminates the time synchronization processing.

When the terminating condition has not been satisfied, the communication control equipment 120 waits only for a predetermined time (S013), and re-executes the time synchronization protocol (S002).

The time synchronization protocol is re-executed to the communication partner determined to have transmitted a conflict packet in the procedure shown in FIG. 6, but it is not necessary to re-execute the protocol. When there is no re-execution of the protocol, the communication control equipment 120 executes a predetermined processing because of failure of the time synchronization with the communication unit 123. Examples of such a processing include notification of the failure of the time synchronization and an identifier of the interested communication unit 123 to a predetermined destination and notification of the failure of the time synchronization to the outside by a predetermined indication method (for example, a monitor connected to the communication control equipment 120, an LED lamp installed in the communication control equipment 120, or an alarm emitted from the communication control equipment 120).

Additionally, a time span from transmission of the Sync message to reception of the first Delay_Req message is measured. When this time span exceeds a predetermined time, it is determined that a packet of the first Delay_Req message has conflicted. Then, the time synchronization protocol may be re-executed with a partner that has transmitted this Delay_Req message. The predetermined time may be defined by measuring the time span until reception of the Delay_Req message experimentally without generating other communication flows.

The wait time at S013 may be determined such that a timing of transmission of the Sync message at S002 becomes a predetermined period or may be changed every time. For example, the wait time at S013 may be changed every time in accordance with the number of conflicts of packets of the Delay_Req messages detected by the queuing-occurrence determination section 135. When the number of changes from S010 to S002 is large (namely, the number of conflicts of packets is large), the first time-synchronized communication unit 123 has a long time span until the next synchronization and thus the processing time thereof is long without synchronization. Therefore, the time synchronization may be executed as soon as possible. When the number of changes from S010 to S002 is small, each of the communication units 123 is considered to have been synchronized relatively precisely, and therefore the wait time may be set rather longer.

The procedure of FIG. 6 is an application of the present invention to the delay request-response method of IEEE 1588. The present invention is applicable also to the peer Delay method of IEEE 1588.

The peer delay method measures a route delay between adjacent nodes by use of a Pdelay_Req message, a Pdelay_Resp message, and a Pdelay_Resp_Follow_Up message (if necessary), and time information is transmitted to each slave by the Sync message. Therefore, the Delay_Req message is unnecessary in the peer delay method.

The present invention may be applied to the peer delay method to measure a route delay by use of the Pdelay_Req, Pdelay_Resp, and Pdelay_Resp_Follow_Up (if necessary). That is, at S002 of FIG. 6, not the Sync message but the Pdelay_Req message is transmitted. At S003 of FIG. 6, reception of the Pdelay_Resp message instead of the Delay_Req message is waited. In the two step mode of the peer delay method, correspondence to the Pdelay_Resp_Follow_Up message is made as well as that to the Follow_Up message.

When connecting between the plural communication units 123 that measure a route delay by use of the network intermediary equipment, a conflict of delay measurement packets within the network intermediary equipment 121 can be detected as in FIG. 6 by measuring a receiving interval of the Pdelay_Resp messages. When the conflict is detected, correspondences such as re-transmission of the Pdelay_Req message and no-use of time information in the received Pdelay_Resp message are illustrated.

As explained above, the communication control equipment 120 of this embodiment can be used for the network configuration using the network intermediary equipment 121, and can determine the existence of conflicts of packets within the network intermediary equipment from a receiving interval of acknowledgement messages of the time synchronization protocol.

When a conflict of the packets occurs, the time synchronization procedure is re-executed, and when no conflict of the packets occurs, the time synchronization protocol is continued without change. Also in the network configuration using the network intermediary equipment 121, the time synchronization protocol is realizable. Therefore, the system of plural time-synchronized communication units sharing the network can be configured. A large-scale time synchronization system can be configured by relaying and extending networks via the network intermediary equipment. According to this embodiment, the time synchronization system can be configured using the communication units 123 based on IEEE 1588 standard without the communication units 123 having a special configuration.

Embodiment 2

In Embodiment 2, the communication control equipment 120 is further provided with a grouping management section, and executes the time synchronization protocol by use of a group of the plural communication units 123 to reduce the probability of conflict of the time synchronization packets of the communication units 123. In the figures used in Embodiment 2, since the same reference numerals as Embodiment 1 show the same functions, components, etc. explained in Embodiment 1 unless otherwise indicated, their explanation is omitted.

Figure 7:
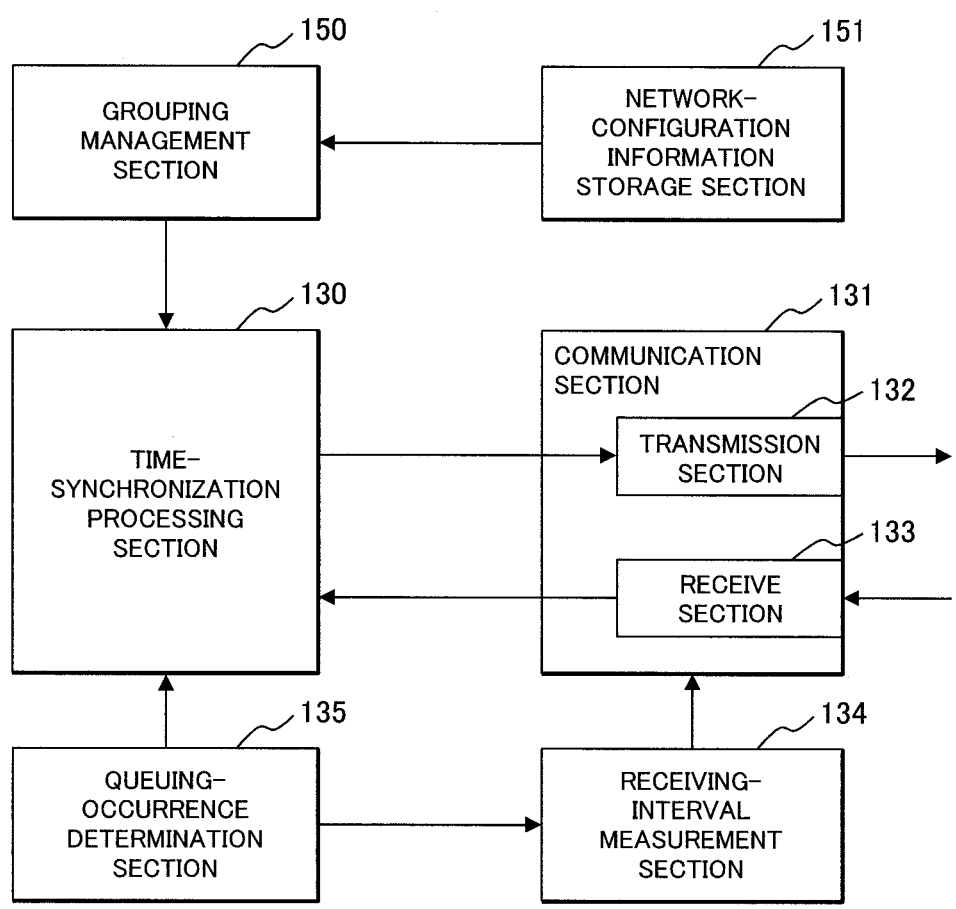
FIG. 7 shows a functional configuration of communication control equipment of Embodiment 2.

FIG. 7 shows a functional configuration of the communication control equipment 120 of Embodiment 2 of the present invention. The communication control equipment 120 of Embodiment 2 is provided with the components of the communication control equipment 120 of Embodiment 1 shown in FIG. 3, and also is provided with a grouping management section 150 and a network-configuration information storage section 151.

Based on information on the network configuration, the grouping management section 150 divides the plural communication units 123 into groups, and provides identifiers to the groups of the communication units 123. In accordance with the number of transmissions of the Delay_Resp messages, success or failure of the time synchronization with each of the communication units 123, etc., the groups of the communication units 123 are notified to the time-synchronization processing section 130. For example, as success or failure of the time synchronization, the groups of the communication units 123 are notified to the time-synchronization processing section 130 based on the number of successes or failures of the time synchronizations or an elapsed time after the last time synchronization is complete.

The network-configuration information storage section 151 stores information on the network configuration used in order that the grouping management section 150 may group the communication units 123. The information on the network configuration includes the number of the devices configuring the network, information on these devices (such as performances of components configuring each device, processing times of hardware and software of the devices, and jitters of the processing times, for example), the network topology, the number of hops to each device, and a measured communication delay to each device.

Figure 8:
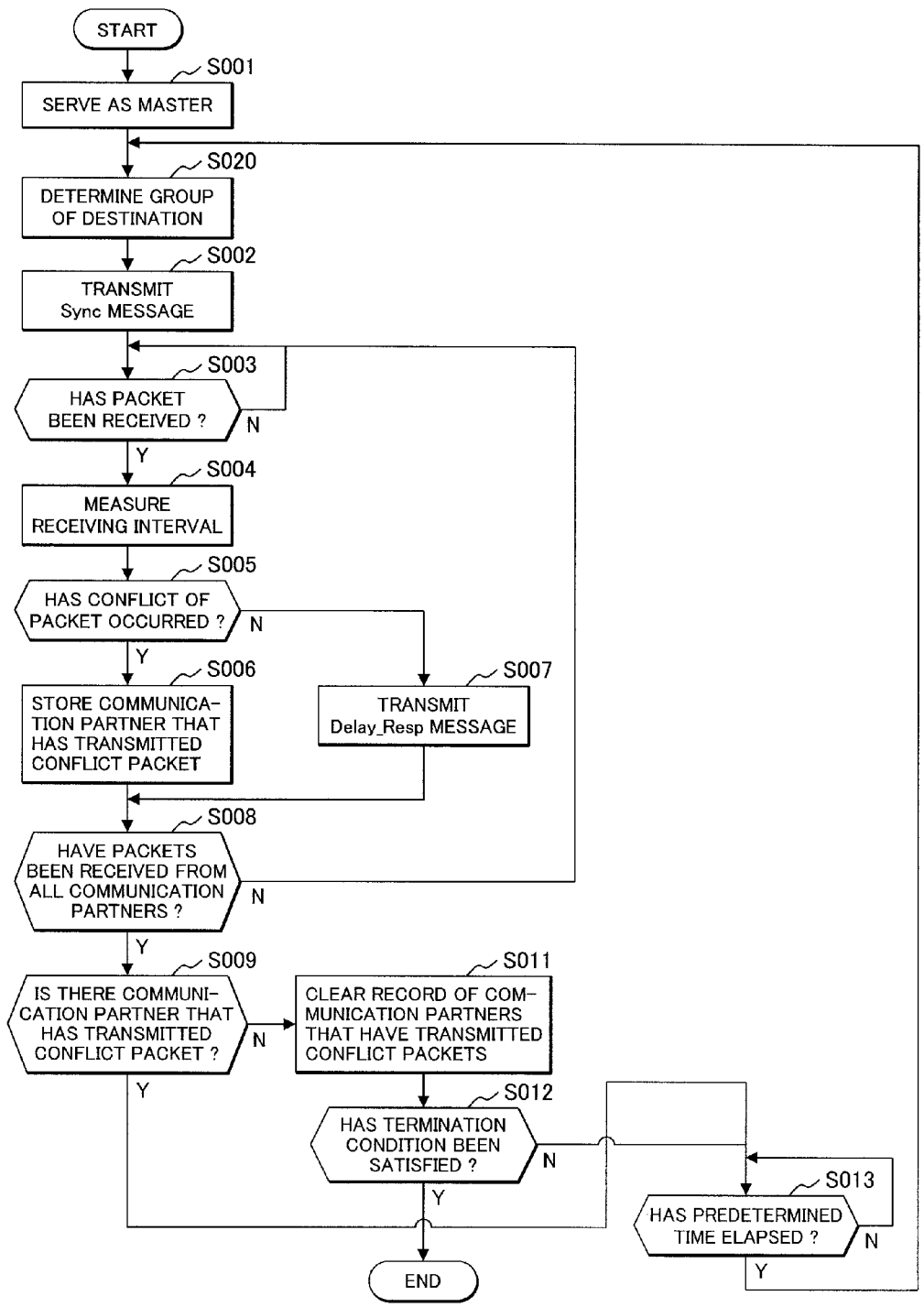
FIG. 8 shows a procedure of time synchronization processing of the communication control equipment provided with a grouping management section of Embodiment 2.

FIG. 8 explains a procedure of the time synchronization processing of the communication control equipment 120 provided with the grouping management section 150. The difference from the time synchronization procedure of the communication control equipment 120 of Embodiment 1 shown in FIG. 6 is such that a procedure S020 of determining a group to which the Sync message is transmitted is added. The difference is also such that there is no procedure S010 of changing a destination of a communication partner and that S020 is re-executed after a wait by a previously predetermined time after S009 (S013).

In S020, the time-synchronization processing section 130 queries the grouping management section 150 for the group of the communication units 123 used to be destinations. The grouping management section 150 that has received the query notifies an identifier of the group used as the destinations to the time-synchronization processing section 130. The grouping management section 150 may notify identifiers of one or plural communication units 123 instead of the identifier of the group. For example, when the number of the communication units 123 used as the communication partners of the communication control equipment 120 is small (for example, one), notifying of the identifiers of the communication units 123 is better than grouping and defining of the small number of the communication units 123.

At S002, the time-synchronization processing section 130 transmits the Sync message to the group of the destinations by use of the identifier of the group notified from the grouping management section 150 at S020 (or identifier of the communication unit 123).

Examples of a method of expressing identifiers of the groups include a method of using VLAN in domain IEEE802.1Q defined by IEEE 1588 or using a multicast address defined by IP (Internet Protocol), IEEE 802.3, or other communication protocols. In addition, any method of communicating with plural communication terminals based on a communication protocol on a network may be used.

Figure 9:
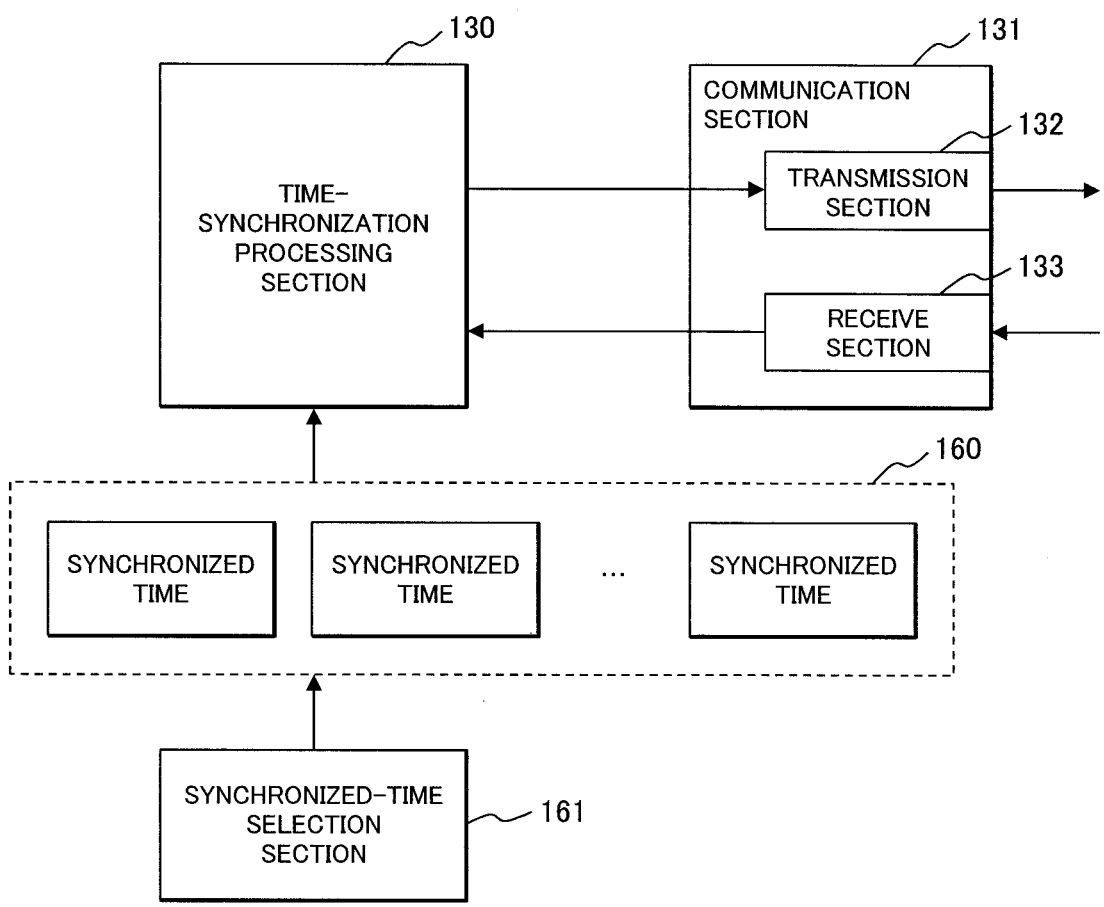
FIG. 9 shows a functional configuration of the communication unit using a domain of IEEE 1588 standard of Embodiment 2.

FIG. 9 shows a functional configuration of the communication unit 123 using a domain of IEEE 1588 standard. The communication unit 123 in Embodiment 2 is provided with the components of the communication unit 123 in Embodiment 1 shown in FIG. 5, and also is provided with a synchronized-time selection section 161. In IEEE 1588, operation on a protocol and a timescale can be defined independently using domains. In this embodiment, synchronized times are managed for every domain within the communication unit 123. Therefore, the synchronized-time selection section 161 selects one from plural synchronized times 160.

A reference of selection of the synchronized time 160 by the synchronized-time selection section 161 includes an identifier of the synchronized time 160, an execution situation of a synchronized time protocol, or an attribute of a master of IEEE 1588 of a corresponding domain (time precision etc.). For example, the synchronized time 160 of a domain in which an execution frequency of the synchronized time protocol is high or the synchronized time 160 of a domain in which a time precision of a master is the highest is selectable.

A method of communicating with the communication control equipment 120 by multiplexing a domain in one communication unit 123 may include a method of configuration of routing control information on the network intermediary equipment 121 (for example, changing a route for each domain) or a method of identifying a domain number on an IEEE 1588 packet in the communication unit 123.

A method of identifying the groups using VLAN in IEEE802.1Q is explained. The VLAN configured by one or more of the communication units 123 and the communication control equipment 120 is defined by the number of defined groups.

At S002 shown in FIG. 8, the time-synchronization processing section 130 sets an identifier of VLAN (VID) notified from the grouping management section 150 at S020 to a tag for VLAN, and transmits the Sync message.

In this case, as the network intermediary equipment 121, one corresponding to VLAN functions is used. In addition, before executing the procedure of FIG. 8, grouping of VLAN is previously set to each piece of the network intermediary equipment 121.

Alternatively, the grouping management may be made using an IP and a multicast address in IEEE 802.3. In this case, a multicast address is defined for each group. Then, by use of a setting required for realization of the multicast address, IGMP (Internet Grouping management Protocol) etc. are executed to the network intermediary equipment 121, communication units 123, and communication control equipment 120.

Next, an example of a grouping management method in the grouping management section 150 is explained. It is desirable that the grouping management has a smaller probability of conflict of packets in the network intermediary equipment 121 on the network if possible.

For example, the method of grouping management can be used in reference to a communication delay between the communication control equipment 120 and the network intermediary equipment 121 and to a communication delay between the communication control equipment 120 and each of the communication units 123. In the preparation for the system configuration, when the time synchronization protocol of IEEE 1588 etc. is executed by one-to-one between the communication control equipment 120 and each of the communication units 123, the communication delay can be determined in the procedure shown already described in FIG. 15.

Alternatively, the grouping management may be made based on the network configuration. For example, on the basis of the number of and performance of the pieces of network intermediary equipment 121 between the communication control equipment 120 and the communication units 123, a communication performance between the pieces of network intermediary equipment 121, a performance of the network, or network media, the grouping management can be made. Examples of the communication performance between the pieces of network intermediary equipment 121 include a communication throughput (10 Mbps, 100 Mbps, or 1 Gbps) of IEEE 802.3, whether a type of communication media is a wired communication or wireless communication, and a type of a telecommunication standard.

As mentioned above, on the basis of the delay information and the network configuration, parameters for grouping each of the communication units 123 can be determined. On the basis of these parameters, the predetermined number of groups may be acquired, and the grouping management of the communication units 123 may be made so that the communication units 123 having the same parameter are distributed to different groups. For example, the grouping management of the communication units 123 is made so that the communication units 123 having the same communication delay are distributed to different groups.

Figure 10:
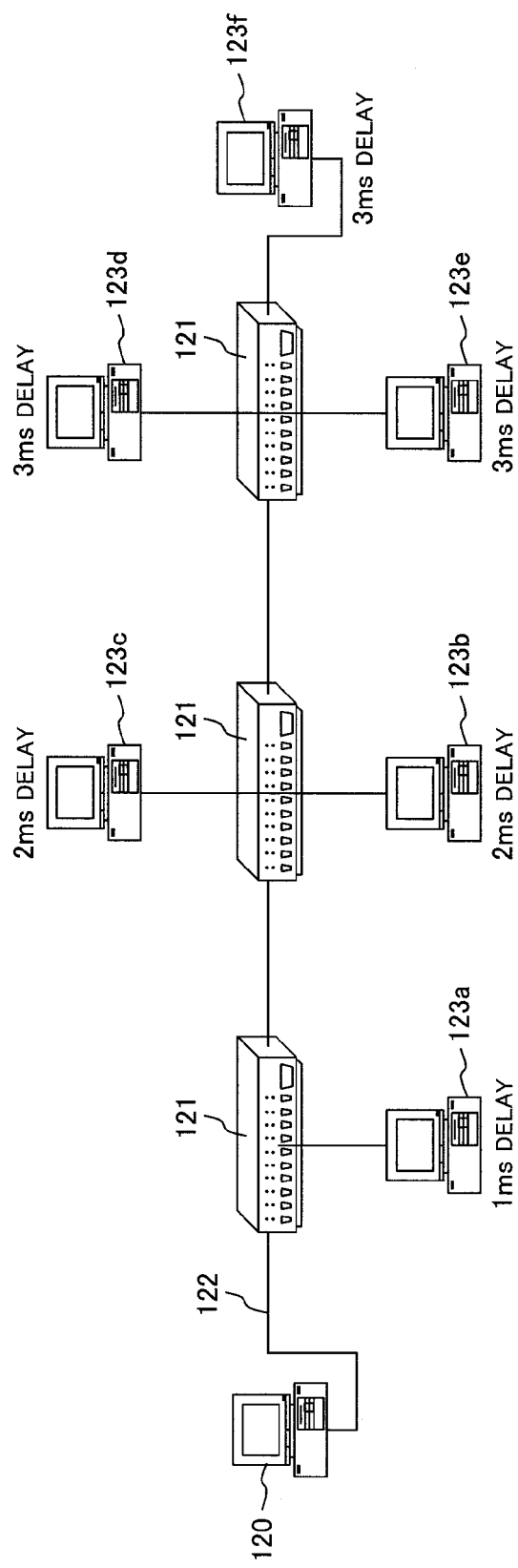
FIG. 10 shows an example of group management of the communication units based on delay information.

FIG. 10 shows an example of grouping management of the communication units based on the delay information. In the distributed control system shown in FIG. 10, the communication control equipment 120 and six communication units 123*a* to 123*f* are connected to the network 122 via the network intermediary equipment 121.

Communication delay times between each of the communication units 123*a* to 123*f* and communication control equipment 120 are respectively set to 1 ms, 2 ms, 2 ms, 3 ms, 3 ms, and 3 ms. When the communication units are expressed by reference numerals 123*a* to 123*f* attached to the communication units, and the number of the groups is set to three, one example of the grouping management of the communication units shows a group of (123*a*, 123*c*, 123*d*), a group of (123*b*, 123*e*), and (123*f*). When the number of the groups is set to two, one example of the grouping management shows a group of (123*a*, 123*c*, 123*d*) and a group of (123*b*, 123*e*, 123*f*). However, in this case, it is expected that the communication unit 123*d* and communication unit 123*e* have a high possibility of conflict of reply packets, and a resynchronization procedure is executed to one of the communication unit 123*d* and communication unit 123*e*. The communication delay between the communication control equipment 120 and each of the communication units 123 may contain a communication processing time (including jitters) of hardware and software on each of the communication units 123. When the communication processing time includes jitters, the grouping management is illustrated on the basis of the worst value or an average value.

As another method of the grouping management, on the basis of the last communication result or the transmission history of the Delay_Resp messages, the group management may be made. For example, the communication units 123 that have transmitted the time synchronization packets determined to have conflicted in the last time synchronization procedure are arranged in an array in chronological order. Then, every other communication unit 123 is selected from this array. Alternatively, when the number of the remaining communication units 123 whose time synchronization is not complete is equal to or below a predetermined number previously defined as a result of the last time synchronization procedure, a method of selecting a previously defined predetermined number of the communication units 123 from these remaining communication units 123 and grouping the selected communication units 123 may be used. This is because it is easier to execute the time synchronization in each of the communication units 123 when the system is compatible.

Alternatively, a method of grouping management based on the delay information illustrated using FIG. 10 and a method of grouping management based on the result of the last time synchronization procedure may be combined. For example, from the group candidates grouped by the grouping management method illustrated using FIG. 10, a group that contains all the communication units 123 in the group configured based on the last result may be notified to the time-synchronization processing section 130. In this method, for example, even when the communication units in which the time synchronization is not complete are the communication units 123*b* and 123*f*, and the communication unit in which the time synchronization is already complete is the communication unit 123*e*, the group of (123*b*, 123*e*, 123*f*) can be notified.

A timing of grouping management of the communication units 123 (grouping the communication units 123) may be at the preparation before actual operations for time synchronization communication and a system application or at a dynamic timing determined in accordance with available information during system operation.

When a communication flow other than the time synchronization procedure is present, a receiving interval between each packet may change. In this case, by maintaining information about communication flows other than the time synchronization procedure in the network-configuration information storage section 151, the queuing-occurrence determination section 135 can determine conflict of packets in the network intermediary equipment 121.

When packets other than ones for the time synchronization protocol are intended for the communication control equipment 120, the packet size Sp is a packet size of a packet other than one for the time synchronization protocol in Formula (3) and Formula (5) to determine a receiving interval between a packet other than one for the time synchronization protocol and a time synchronization packet. When a receiving interval is determined using a reception time of the end of a packet and a reception time of the start of the next packet as in Formula (8) and Formula (9), the data size is not influenced.

Figure 11:
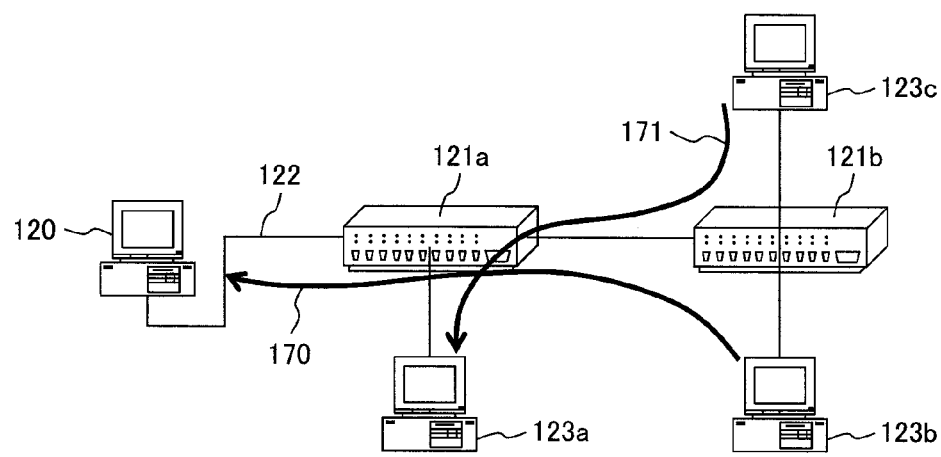
FIG. 11 shows an example of a communication flow when packets which are not for a time synchronization protocol are not intended for the communication control equipment.

FIG. 11 shows an example of the communication flow when a packet other than one for the time synchronization protocol is not intended for the communication control equipment 120. As shown in FIG. 11, it is assumed that there is a communication flow 170 of the time synchronization protocol from the communication unit 123*b* to the communication control equipment 120, and that there is a communication flow 171 of other than the time synchronization protocol from the communication unit 123*c* to the communication unit 123*a*. Further, it is assumed that the communication control equipment 120 and communication unit 123*a* are time-synchronized with each other. In FIG. 11, different reference numerals 121a and 121b are attached to the pieces of network intermediary equipment.

A packet of the communication flow 170 may conflict with a packet of the communication flow 171 in the network intermediary equipment 121a and 121b. It is difficult to estimate a delay of the packet of the communication flow 170 in the network intermediary equipment 121a and 121b due to this packet conflict by use of a past technology, but it is possible to estimate this delay in this embodiment. It is possible to estimate this delay by synchronizing the communication unit 123a and the communication control equipment 120 and then by acquiring a reception time of the packet of the communication flow 171 in the communication unit 123a.

When the communication control equipment 120 receives the packet of the communication flow 170, the communication control equipment 120 queries the communication unit 123a for reception of the packet of the communication flow 171. The communication control equipment 120 queries the communication unit 123a for the reception time when the communication unit 123a has received the packet. When the communication unit 123a has received the packet of the communication flow 171, and a difference between the reception time of this packet and the reception time of the time synchronization packet in the communication control equipment 120 is the receiving interval T of Formula (10), and when this receiving interval T satisfies Formula (10), the time synchronization procedure is re-executed because the conflict has occurred.

Thus, even when the different equipment or device (the communication control equipment 120 and communication unit 123a) receive packets, it is possible to estimate whether the conflict has occurred by obtaining the receiving interval between the two packets of the different equipment or device.

A condition that the communication control equipment 120 queries the communication unit 123a is reception of the time synchronization packet. The condition may be every reception or a case where a receiving interval between a reception of a packet and a reception of its preceding packet is longer than a predetermined value. Alternatively, execution of the query may be determined based on time information in the time synchronization packet. After the communication unit 123 and the communication control equipment 120 are synchronized, a communication delay relative to a synchronized unit can be estimated also in the communication control equipment 120. When the estimated value is larger than an average to date, it is thought that the conflict with the communication flow 171 has occurred. At this time, the network-configuration information storage section 151 can maintain information such as a packet size of a communication flow intended for each communication unit 123, a packet size of the communication flow 171, a connecting relation of the communication units 123, etc.

Figure 22:
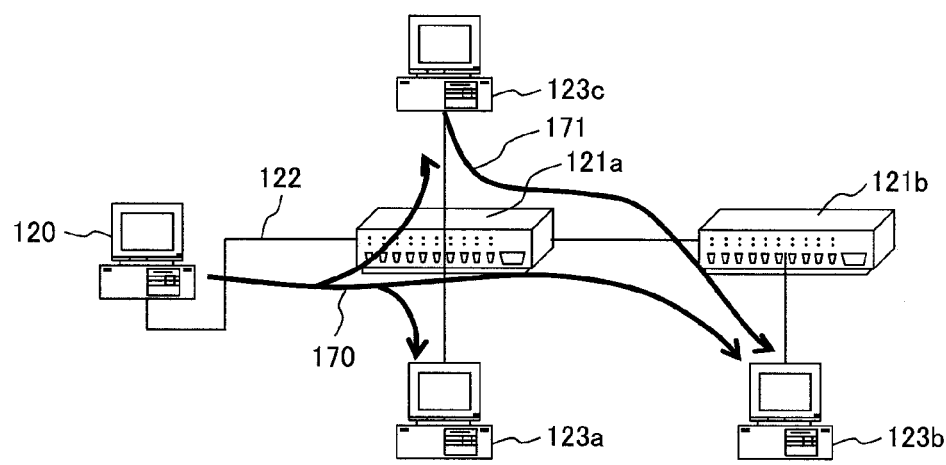
FIG. 22 shows an example wherein a communication flow which is not a time synchronization procedure conflicts with a time synchronization packet transmitted from the communication control equipment to the communication unit.

FIG. 22 shows an example of the communication flow when a communication flow other than the time synchronization procedure occurs between the communication units 123, and conflicts with the time synchronization packets (Sync messages) transmitted from the communication control equipment 120 to the communication units 123. FIG. 22 shows the communication flow 171 from the communication unit 123c to the communication unit 123b and the communication flow 170 of the time synchronization protocol from the communication control equipment 120 to the communication unit 123b.

In such a case, the Sync message of the communication flow 170 of the time synchronization protocol may conflict with the packet of the communication flow 171 in the network intermediary equipment 121a and 121b. A forward delay and backward delay of the communication flow 170 of the time synchronization protocol are not exactly equal. In such a case, for example, the communication unit 123c may transmit the packet of the communication flow 171 to the communication unit 123b within a predetermined time after receiving the Sync message. In this way, the conflict of the packets within the network intermediary equipment 121 is avoidable.

As a countermeasure for the case in which a communication flow other than the time synchronization procedure is present, there is also a method of introducing a TC (Transparent Clock defined by IEEE 1588 standard) explained in Embodiment 6 mentioned later into a portion where other communication flow 171 flows.

As explained above, the communication control equipment 120 is provided with the grouping management section 150 to group the communication units 123 for reduction of the probability of conflict of the packets, and the time synchronization can be executed even in the configuration using the network intermediary equipment 121.

Embodiment 3

Embodiment 3 shows the devised communication units 123 in Embodiments 1 and 2. In the figures used in Embodiment 3, since the same numerals as Embodiments 1 and 2 are the same as those of the functions, components, etc. explained in Embodiments 1 and 2 unless otherwise indicated, their explanation is omitted.

Figure 12:
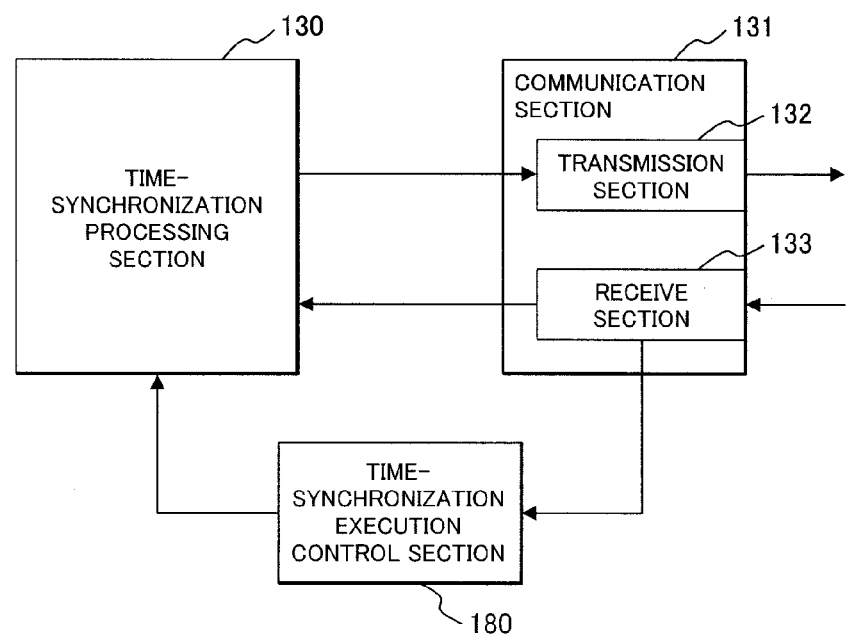
FIG. 12 shows a functional configuration of the communication unit in Embodiment 3.

FIG. 12 shows a functional configuration of the communication unit 123 in Embodiment 3. The communication unit 123 in Embodiment 3 is provided with the components of the communication unit 123 in Embodiment 1 shown in FIG. 5 and further a time-synchronization execution control section 180.

The time-synchronization execution control section 180 controls transmission timings of packets of the time-synchronization processing section 130. The transmission timings may be controlled based on the information notified from the communication control equipment 120, or based on operation of the time-synchronization processing section 130.

Figure 13:
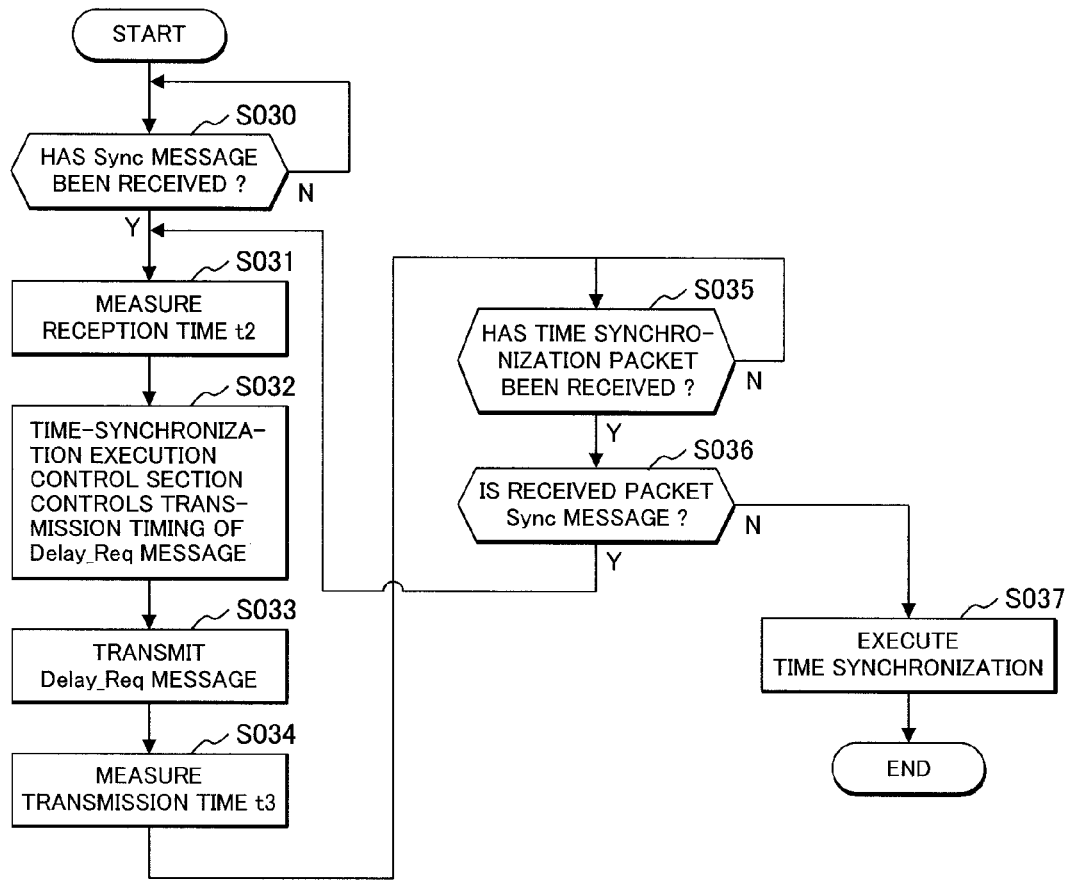
FIG. 13 is a flowchart to show operation of the communication unit in Embodiment 3.

FIG. 13 is a flowchart showing operation of the communication unit 123.

First, a reception of the Sync message is waited for (S030).

When the Sync message is received, the reception time t2 of the Sync message is measured and stored (S031).

Next, the time-synchronization execution control section 180 controls a transmission timing of the Delay_Req message (S032). Specifically, wait is made by a predetermined time.

After elapse of the predetermined time, the Delay_Req message is transmitted to the communication control equipment 120 (S033).

Next, the transmission time t3 of the Delay_Req message is measured and recorded (S034).

Next, wait is made until reception of a time synchronization packet (S035).

When the time synchronization packet is received, it is determined whether the received packet is the Sync message (S036).

When the received packet is the Sync message, it is determined that the communication control equipment 120 has re-executed the time synchronization procedure, and the procedure of S031 to S035 is executed.

Figure 15:
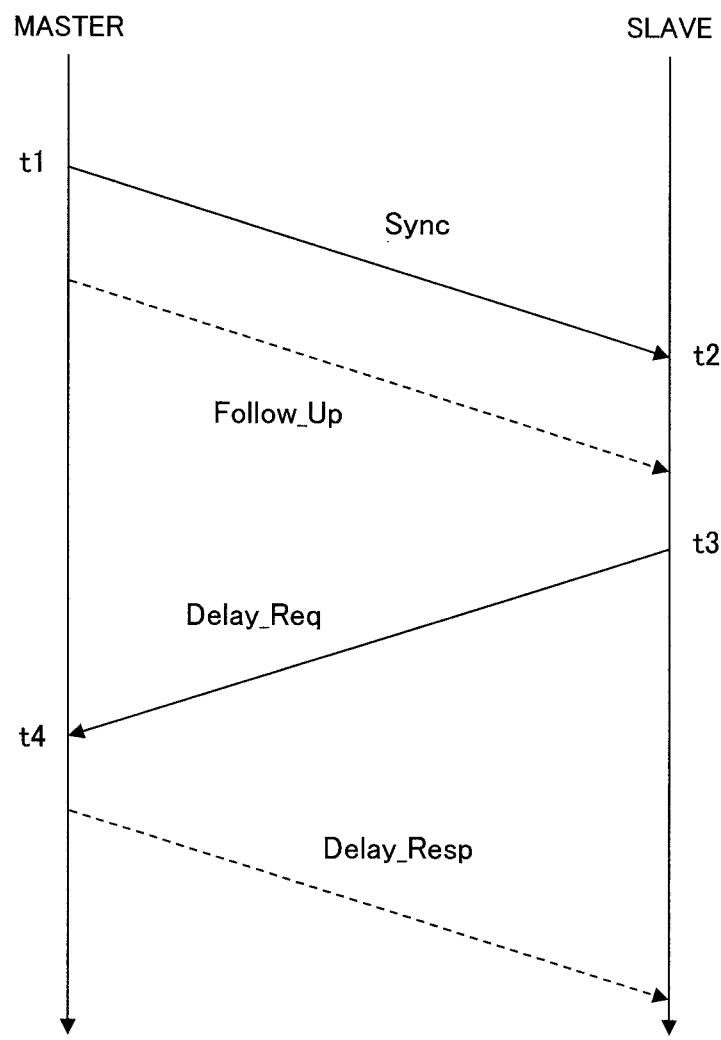
FIG. 15 shows exchanges of messages between a master and a slave in IEEE 1588.

At S036, when the received time synchronization packet is not the Sync message, the synchronization processing is executed (S037). The synchronization processing procedure is as shown in FIG. 15 described above. Namely, by use of the time t1 (transmission time of the master) in the Sync message or Follow_Up message not shown in FIG. 13, the time t4 (reception time of the Delay_Req message in the master) in the Delay_Resp message, and the above times t2 and t3, the time synchronization with the communication control equipment 120 is executed.

Characteristically, the communication unit 123 in this embodiment can control the transmission timing of the Delay_Req message by use of the time-synchronization execution control section 180 (S032). That is, the time-synchronization execution control section 180 can control the wait time from the reception of the Sync message to the transmission of the Delay_Req message. The probability of conflict of time synchronization packets of the other communication units 123 can be reduced using these characteristics.

The wait time until the transmission of the Delay_Req message may be determined by the communication unit 123 based on the information notified from the communication control equipment 120 or independent of the communication control equipment 120.

The communication control equipment 120 can control the wait time of the time-synchronization execution control section 180 by use of a receiving interval of the Delay_Req messages. For example, when the communication control equipment 120 determines that the packets have conflicted from the receiving interval of the Delay_Req messages, the wait time of the communication unit 123 that has transmitted the conflict packet can be made long or short by a predetermined time.

The communication control equipment 120 can control the wait time of the time-synchronization execution control section 180 by IEEE 1588 standard. In IEEE 1588, a transmitting period of the Delay_Req message of a slave is controllable based on a transmitting period of the Sync message of a master. Specifically, the slave transmits the Delay_Req message once in a predetermined period in which the master transmits the Sync message. For example, by use of this specification, when the communication control equipment 120 determines that the packet has conflicted, the transmission timing of the Delay_Req message is controlled by increasing or decreasing the transmission frequency of the Delay_Req message of the communication unit 123 that has transmitted the conflict packet.

When the communication unit 123 receives the Sync message after transmission of the Delay_Req message, the communication unit 123 can estimate the communication control equipment 120 to determine that the packet has conflicted to re-execute the time synchronization procedure. Therefore, there is also a method of making short the wait time of the time-synchronization execution control section 180 by a predetermined time when the Sync message is received after transmission of the Delay_Req message. Alternatively, the communication control equipment 120 may notify the communication units 123 explicitly that the conflict of the packet has been detected.

All the communication units 123 do not need to be provided with the time-synchronization execution control section 180 of this embodiment. When at least some communication units 123 are provided with the time-synchronization execution control section 180, their advantageously effect can be obtained. In this case, identifiers of the communication units 123 provided with the time-synchronization execution control section 180 may be maintained in the network-configuration information storage section 151. The communication control equipment 120 is able to determine the communication units 123 provided with the time-synchronization execution control section 180 by use of the identifiers of the communication units 123 maintained in the network-configuration information storage section 151, and able to transmit an instruction of a wait time to each time-synchronization execution control section 180 of these communication units 123.

Information required for the Sync message transmitted at the re-execution of the time synchronization by the communication control equipment 120 can be embedded in the Delay_Req message transmitted from the communication units 123. Examples of such information include the information about the identifiers of the communication units 123 concerning destinations of the Sync message and a group of the destinations determined at S020 of FIG. 8. For example, on the Delay_Req message transmitted by the communication unit 123, domain information of IEEE 1588 standard to which this communication unit 123 belongs is placed. When the communication control equipment 120 determines that the packet from this communication unit 123 has conflicted, the communication control equipment 120 is able to again transmit the Sync message by use of the domain information placed on the Delay_Req message. In this method, since the communication control equipment 120 does not need to query the grouping management section 150 for a group of destinations, the communication control equipment 120 is able to transmit the Sync message in a short time.

In this case, the communication control equipment 120 may notify grouping management information such as domain information to the communication unit 123 previously.

The transmission timing of the Delay_Req message of the communication unit 123 can be also controlled by other communication units 123 and by not only itself or other communication units 123 but a dedicated device and the network intermediary equipment 121. For convenience, in the following explanation, a device that controls transmission timings of the time synchronization packets of the communication units 123 is called a "time synchronization control device 190."

Figure 16:
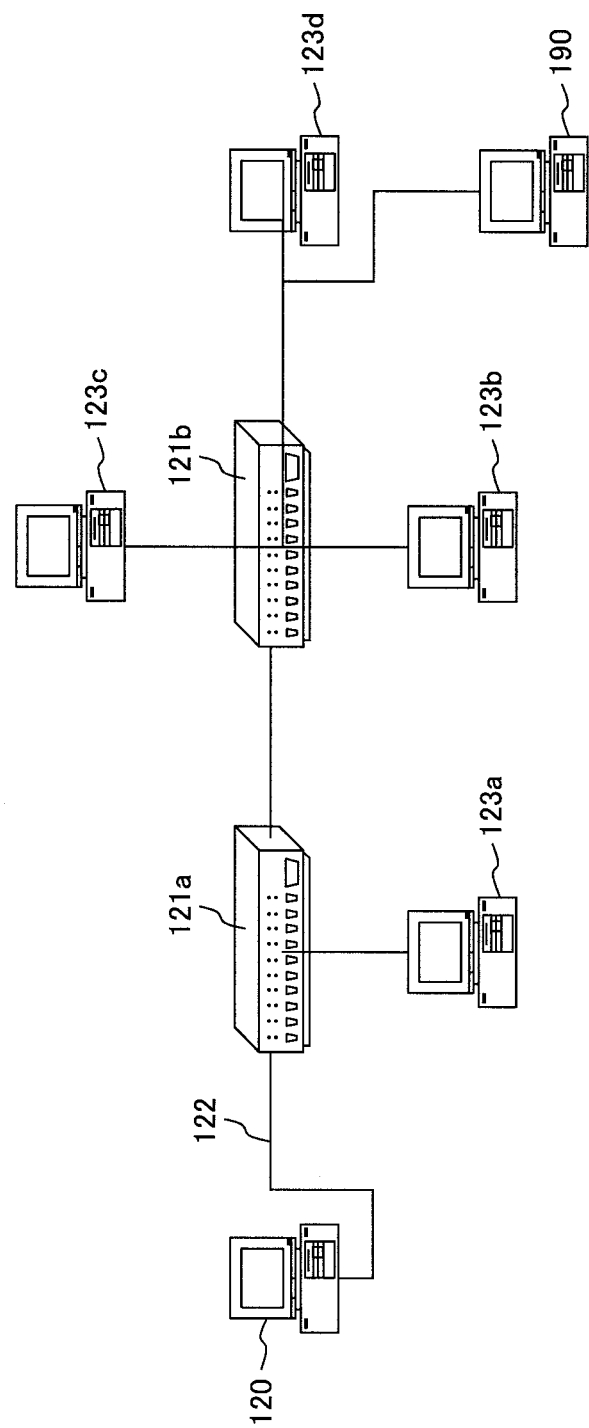
FIG. 16 shows an example of a distributed control system using a time synchronization control device.

FIG. 16 shows an example of a distributed control system using the time synchronization control device 190. The time synchronization control device 190 is connected to the communication control equipment 120 and communication units 123a to 123d via the network 122.

Figure 17:
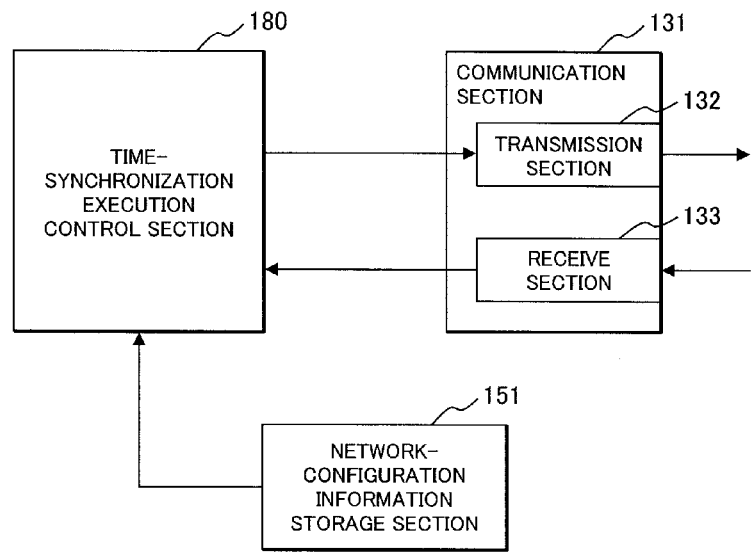
FIG. 17 shows a functional configuration of the time synchronization control device.

FIG. 17 shows a functional configuration of the time synchronization control device 190. The time synchronization control device 190 is provided with the communication section 131 shown in FIG. 3, the network-configuration information storage section 151 shown in FIG. 7, and the time-synchronization execution control section 180 shown in FIG. 12. When the time synchronization control device 190 monitors packets on the network and detects the communication unit 123 that is executing the time synchronization procedure while transmitting a conflicting time synchronization packet, the time synchronization control device 190 delays or advances transmission of the Delay_Req message from this communication unit 123 by a predetermined time. Alternatively, the communication control equipment 120 may explicitly notify the time synchronization control device 190 that the time synchronization packet has conflicted.

The monitoring of packets is executed by reception of packets on the network by setting the receive section 133 of the communication section 131 in a Promiscuous mode. After confirmation that the communication unit 123 has transmitted the Delay_Req message, when the time synchronization control device 190 confirms that the Sync message has been transmitted to the same communication unit 123, the time synchronization control device 190 estimates the communication control equipment 120 to determine that the packet has conflicted and to re-execute the time synchronization procedure, and determines that the conflict of the time synchronization packets has occurred.

Examples of a method of controlling transmission timings of the Delay_Req messages of other communication units 123 include a method of making transmission of other communication units 123 pause for a predetermined time by use of a PAUSE frame in IEEE 802.3 and a method of using a dedicated protocol. When using the dedicated protocol, at least the information on the communication partners and the time information for controlling the transmission timing (wait time, transmission time, and so on) are used. Alternatively, when a packet of the dedicated protocol is received, the transmission may be made. In this case, the communication unit 123 may be configured so that the transmission is not executed until reception of the packet of this dedicated protocol.

The time synchronization control device 190 does not need to control all the communication units 123, but may control some communication units 123.

The time synchronization control device 190 is also able to control the transmission timings of the Delay_Req messages of the plural communication units 123 on the basis of attributes of the communication units 123 and the synchronization procedure results to date. For example, a priority is set in each of the communication units 123, and a wait time of the communication unit 123 can be set in accordance with the priority. Alternatively, the wait time can be adjusted in accordance with the conflict frequency of the packets in the time synchronization procedure to date and a precision of the clock of the communication unit 123. In adjustment of the wait time in accordance with the conflict frequency of the packets, a shorter wait time is set in the communication unit 123 transmitting a larger number of packets causing no conflict, for example. In adjustment of the wait time in accordance with the precision of the clock, a shorter wait time may be set in the communication unit 123 having a higher clock precision, for example. The information required to control the transmission timings of the Delay_Req messages is managed and maintained by the network-configuration information storage section 151 in the time synchronization control device 190.

As explained above, also in this embodiment, the time synchronization can be executed in the distributed control system using the network intermediary equipment 121. Further, the probability of the conflict of packets can be reduced by controlling the transmission timings of the packets by use of the communication units 123, and the load on the calculation and control of the communication control equipment 120 also can be reduced by distributed processing.

Embodiment 4

Embodiment 4 is such that, in the network intermediary equipment 121, the processing times of the packets are made steady to reduce a difference between the forward and backward communication delays due to the conflict of the packets. In the figures used in Embodiment 4, since the same numerals as Embodiments 1 to 3 are the same as those of the functions, components, etc. explained in Embodiments 1 to 3 unless otherwise indicated, their explanation is omitted.

When the time synchronization packet is queued in the network intermediary equipment 121, forward and backward delays of the time synchronization packet are different from one another to generate different communication delays. In this embodiment, a large processing delay is used if needed and a difference between forward and backward delays of the time synchronization packet is reduced. However, to improve the communication performance of the system, it is desirable to reduce a wait time of the time synchronization packet within the network intermediary equipment 121. Thus, in this embodiment, the wait time is reduced using the conflict determination results of packets by the communication control equipment 120 etc.

Figure 18:
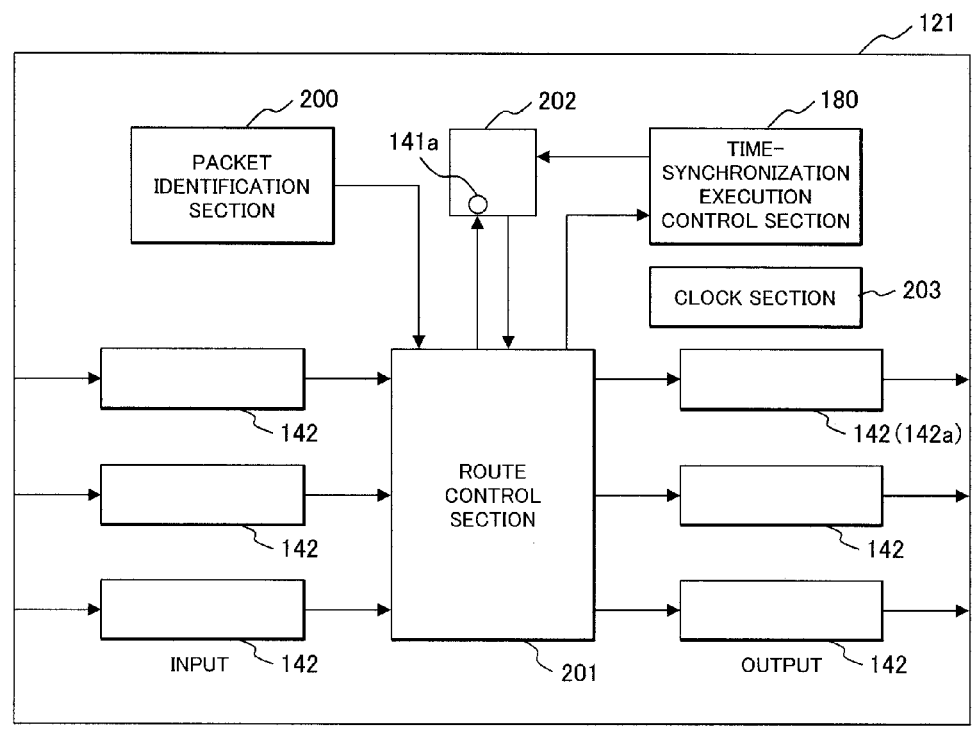
FIG. 18 shows a functional configuration of the network intermediary equipment in Embodiment 4.

FIG. 18 shows a functional configuration of the network intermediary equipment 121 in this embodiment. The network intermediary equipment 121 includes a packet identification section 200, a route control section 201, a buffer 202, the buffer 142 shown in FIG. 4, the time-synchronization execution control section 180 shown in FIG. 12, and a clock section 203. Three buffers 142 (input buffer) are connected to the input side of the route control section 201, and three buffers 142 (output buffer) are connected to the output side thereof.

The packet identification section 200 identifies a type of a packet based on predetermined characteristics of packets. The route control section 201 selects an output destination from the buffers 142 on the basis of information stored in a packet and forwards the packet thereto. The buffer 202 maintains packets.

The clock section 203 measures times. The packet identification section 200, route control section 201, and time-synchronization execution control section 180 acquire times from the clock section 203. In FIG. 18, lines showing relationship between the clock section 203 and other sections (packet identification section 200, route control section 201, and time-synchronization execution control section 180) are not shown.

The operation procedure of the network intermediary equipment 121 in this embodiment is explained. First, a characteristic of a packet to be identified is set in the packet identification section 200. The characteristic of the packet to be identified may be set via the network 122 from the communication control equipment 120 or communication units 123, or may be directly set in the network intermediary equipment 121.

In direct setting in the network intermediary equipment 121, input means not shown in FIG. 18 may be required. The information to be set is information to identify a communication flow between the communication control equipment 120 and the communication units 123, and includes a transmission source address, a transmission destination address, a domain in IEEE 1588, an identifier of VLAN, and a multicast address.

When a packet is input into the buffer 142 (input buffer) of the network intermediary equipment 121, the packet identification section 200 determines whether a characteristic of this packet matches the previously set characteristic. When the characteristic of this packet matches the previously set characteristic, the packet identification section 200 notifies the route control section 201 and the time-synchronization execution control section 180 of the completion of the matching and the matched condition (characteristic). A the same time, the packet identification section 200 acquires a time Tin at which the packet is input into the buffer 142 from the clock section 203, and notifies the route control section 201 of the time Tin.

On reception of the notification from the packet identification section 200, the route control section 201 forwards the packet to the buffer 202 without transmitting the packet to the buffer 142 (output buffer). The packet transmitted to the buffer 202 is set as a packet 141a. The output buffer to which the packet 141a is to be transmitted is set as a buffer 142a.

It is necessary to determine a time of maintaining the packet 141a in the buffer 202 in consideration of a delay time due to other packets. The delay time due to other packets is a communication processing time of a preceding packet that is present in the buffer 142 and a packet transmitted to the buffer 142 after reception of the packet 141a.

After forwarding the packet to the buffer 202, the route control section 201 notifies the time-synchronization execution control section 180 of the number and data sizes of packets in the buffer 142a and the number and data sizes of packets forwarded to the buffer 142a after reception of the packet 141a.

On the basis of the notified information, the time-synchronization execution control section 180 calculates a communication processing time d of these packets, and calculates a wait time Tw by subtracting the communication processing time d from a remaining time R until a target output time Tout. That is, the wait time Tw can be determined by Formula (11). The target output time Tout is determined by adding a predetermined staying time α to the time Tin. The staying time a may be a fixed value or changed between forward and backward of a packet.

$$Tw = R - d \qquad (11)$$

The remaining time R is a time (R=Tout−(current time)) from a current time to the target output time Tout. The current time is acquirable from the clock section 203. The communication processing time d can be determined, for example, by Formula (3).

The time-synchronization execution control section 180 notifies the calculated wait time Tw to the route control section 201. Since the communication processing time d changes in each reception of following packets, the time-synchronization execution control section 180 calculates the wait time Tw, and notifies it to the route control section 201.

The route control section 201 forwards the packet 141a to the buffer 142a when the wait time Tw elapses from the current time.

It should be considered here that, when a certain following packet is forwarded to the buffer 142a, the remaining time to maintain the packet 141a may elapse. For example, it is necessary to retain the packet 141a for more 50 μs, and a processing time for the following packet is 60 μs. In such a case, when the following packet is forwarded to the buffer 142a, the staying time α in the network intermediary equipment 121 cannot be fixed. Therefore, an example in which such a following packet is not forwarded to the buffer 142a, but maintained (blocked) until forwarding of the packet 141a may be shown as a countermeasure.

Then, by the wait time Tw notified from the time-synchronization execution control section 180, the route control section 201 maintains the packet in the buffer 202. After elapse of the wait time Tw, the packet is output to the buffer 142 in accordance with the output destination. The route control section 201 uses the clock section 203 to determine a time to output the packet to the buffer 142.

An example of the method of determining a time for the route control section 201 to output a packet and outputting the packet to the buffer 142 includes a method of determining the time Tout by adding the above wait time to the time Tin acquired from the clock section 203 and notifying the elapse of the wait time Tw from the clock section 203 to the route control section 201 at the time Tout. Alternatively, the route control section 201 may acquire the time until elapse of the wait time Tw from the clock section 203 at a predetermined interval.

An example of a method of setting the staying time α in the time-synchronization execution control section 180 includes notification of the wait time Tw to the time-synchronization execution control section 180 from the communication control equipment 120 that has detected the conflict of a packet via the network 122. Alternatively, to achieve the setting method, the time-synchronization execution control section 180 monitors packets flowing through the network intermediary equipment 121, and a predetermined time for a communication combination in which the Delay_Req message flows and then the Sync message flows in the reverse direction is made long or short.

The network intermediary equipment 121 may be configured to acquire the staying time α or wait time Tw from the outside. The staying time α or wait time Tw may be acquired by providing certain connection means in the network intermediary equipment 121. The network intermediary equipment 121 may transmit the staying time α or wait time Tw to the outside through communication by use of the network 122.

For example, after recognition of a predetermined packet format, the staying time α or wait time Tw is stored in the packet. A system manager can change the configuration of the system or the network in consideration of the influence on the system by use of that information when the staying time α or wait time Tw is particularly long.

The packet identification section 200 can be used for identification of a communication flow.

As explained above, according to this embodiment, by reducing the delay difference due to the conflict in the network intermediary equipment 121, the distributed control system can be configured to execute the time synchronization. The degradation of the communication performance of the whole network can be reduced by optimizing the wait time of the network intermediary equipment 121.

Embodiment 5

Embodiment 5 is such that, when plural routes are present through the network intermediary equipment 121 between the communication control equipment 120 and the communication units 123, the probability of conflict of packets is reduced by changing the communication routes. In the figures used in Embodiment 5, since the same numerals as Embodiments 1 to 4 are the same as those of the functions, components, etc. explained in Embodiments 1 to 4 unless otherwise indicated, their explanation is omitted.

Figure 19:
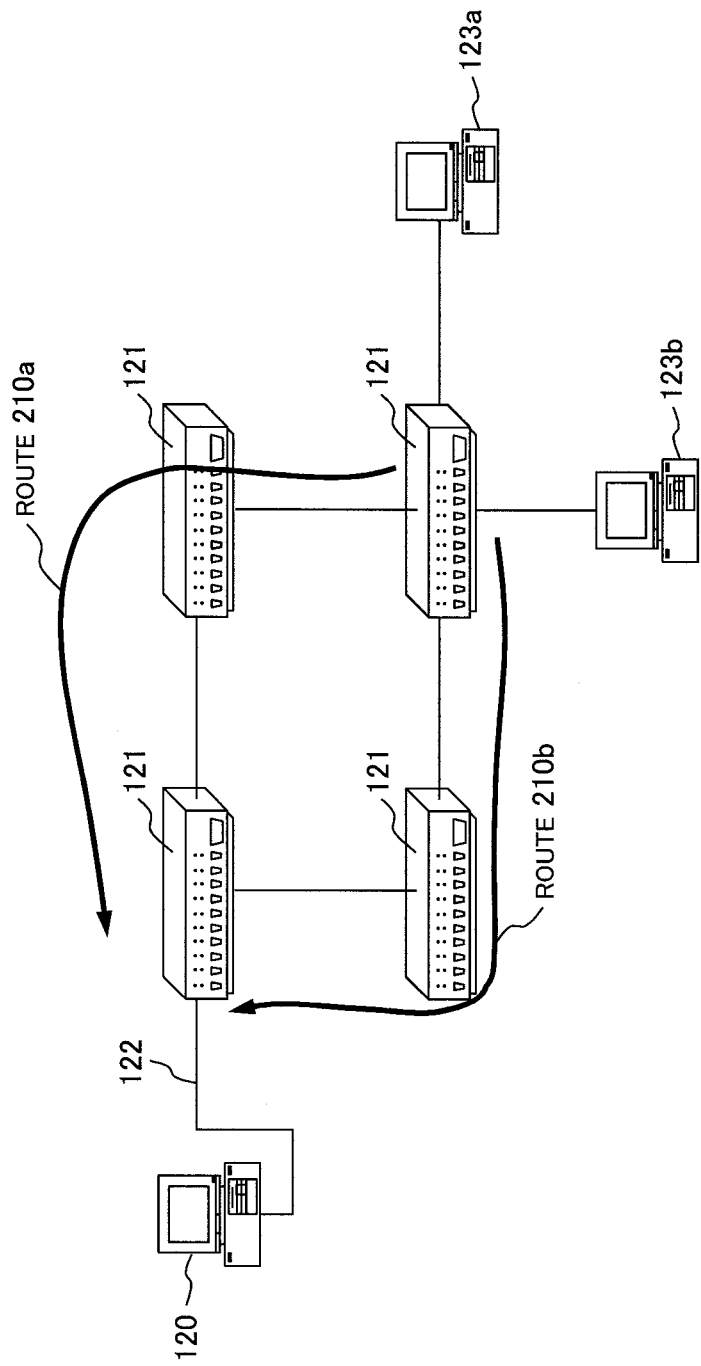
FIG. 19 shows a configuration of a distributed control system in Embodiment 5.

FIG. 19 shows a configuration of a distributed control system in this embodiment. In the distributed control system of FIG. 19, the communication control equipment 120, two communication units 123a and 123b, and four pieces of communication control equipment 120 are connected via the network 122.

The communication routes between the communication unit 123a and the communication control equipment 120 are a route 210a and a route 210b. The communication routes between the communication unit 123b and the communication control equipment 120 are also the route 210a and route 210b. At this time, when the communication unit 123a and the communication unit 123b properly use the communication route 210a and communication route 210b, the probability that packets conflict within the network intermediary equipment 121 can be reduced.

This is realizable by using a static routing, a dedicated routing protocol, MPLS (Multi-Protocol Label Switching), etc. Group identification identifiers (multicast address etc.) may be properly used for each route. Alternatively, in a controller in an OpenFlow protocol, the rule to properly use destination ports by distinguishing destinations may be set to realize the reduction of the conflict.

The route may be changed between the Sync message and Delay_Req message, namely, between a forward route and backward route. For example, when the Sync message is transmitted from the communication control equipment 120 to the communication unit 123a, the communication route 210a may be used, and when the Delay_Req message is transmitted from the communication unit 123a to the communication control equipment 120, the communication route 210b may be used. At this time, communication delays in the communication route 210a and communication route 210b are acquired by experimental determination etc., and used at the time synchronization.

The communication route 210a and communication route 210b can be properly used based on the determination result of conflict of packets by the communication control equipment 120. For example, when the communication control equipment 120 determines that packets have conflicted, the network can be set to use a different communication route while setting the interested communication unit 123a in a different group.

In this embodiment, there is an advantageous effect that the time synchronization system can be configured using the network intermediary equipment 121.

Embodiment 6

Embodiments 6 is such that the network is configured by a hybrid of the network intermediary equipment 121 of the Transparent Clock (hereafter abbreviated as "TC") defined by IEEE 1588 standard and the network intermediary equipment 121 that is not the TC. In the figures used in Embodiment 6, since the same numerals as Embodiments 1 to 5 are the same as those of the functions, components, etc. explained in Embodiments 1 to 5 unless otherwise indicated, their explanation is omitted.

The TC stores a processing delay in the network intermediary equipment 121 in each packet. The communication unit 123 that has received this packet can determine a difference between a forward delay and a backward delay by use of information about these processing delays.

Figure 20:
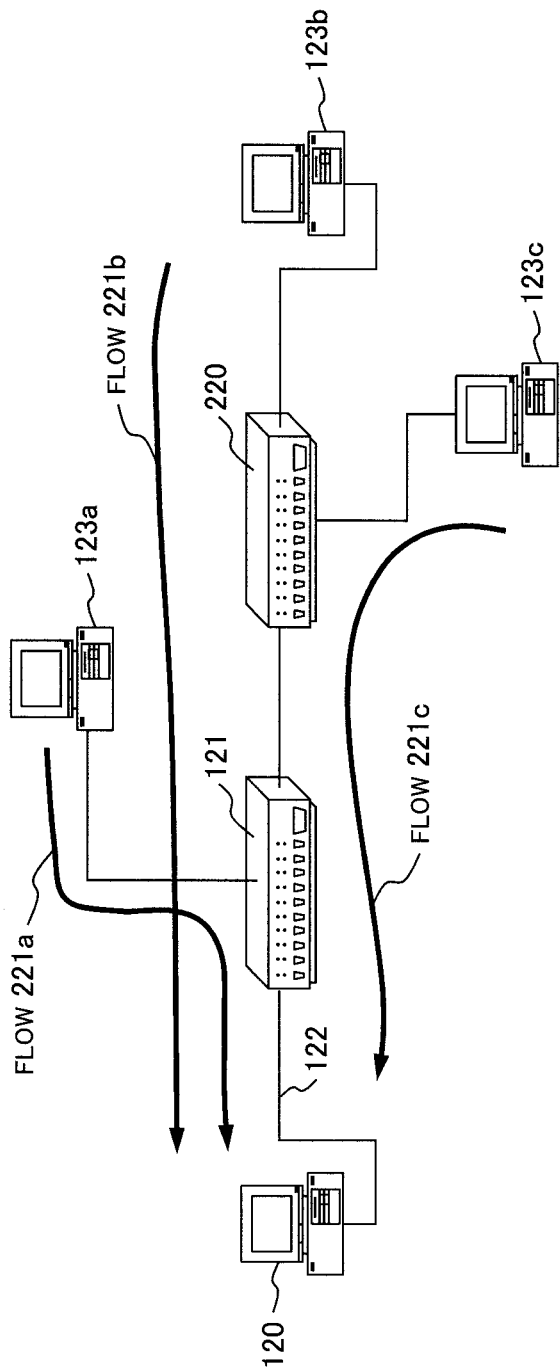
FIG. 20 shows a configuration of a distributed control system in Embodiment 6.

FIG. 20 shows a configuration of a distributed control system in this embodiment. In the distributed control system of FIG. 20, the communication control equipment 120, three communication units 123a to 123c, the network intermediary equipment 121, and a TC 220 are connected via network 122.

When attention is directed to transmission of the Delay_Req message from each of the communication units 123a to 123c, packets of a communication flow 221b and a communication flow 221c may conflict in the TC 220, and the communication flow 221a, communication flow 221b, and communication flow 221c may conflict in the network intermediary equipment 121.

However, even when the packets conflict in the TC 220, jitters of the delays due to the conflict can be corrected by the function of the TC. On the other hand, in the network intermediary equipment 121, the jitters of the delays is difficult to correct.

In this embodiment, the communication control equipment 120 measures receiving intervals of the packets of the communication flows 221a to 221c to determine whether the packets have conflicted by use of Formula (10).

At this time, after receiving the time synchronization packet of the communication flow 221a, the communication control equipment 120 receives packets of one or both of the communication flow 221b and communication flow 221c. When determining that these packets have conflicted from receiving intervals of the packets, the communication control equipment 120 re-executes the time synchronization processing to the communication unit that has transmitted the packet of the communication flow that has conflicted with the packet of the communication flow 221a.

Similarly, after receiving the packets of one or both of the communication flow 221b and communication flow 221c, the communication control equipment 120 receives the packet of the communication flow 221a, and also when determining that the packet of the communication flow 221a has conflicted, the communication control equipment 120 re-executes the time synchronization processing. This is because the packet of the communication flow 221a and the packet of at least one of the communication flow 221b and communication flow 221c are estimated to have conflicted within the network intermediary equipment 121.

On the other hand, when the packet of the communication flow 221b and the packet of the communication flow 221c conflict, it is not necessary to re-execute the synchronization processing by the function of TC 220. Since the communication delay within the TC 220 is acquirable by the function of the TC 220, correction is possible based on the communication delay in the TC 220 even when these packets conflict. The communication delays in the TC 220 are stored in the time synchronization packet in the communication flow 221b and communication flow 221c.

Figure 24:
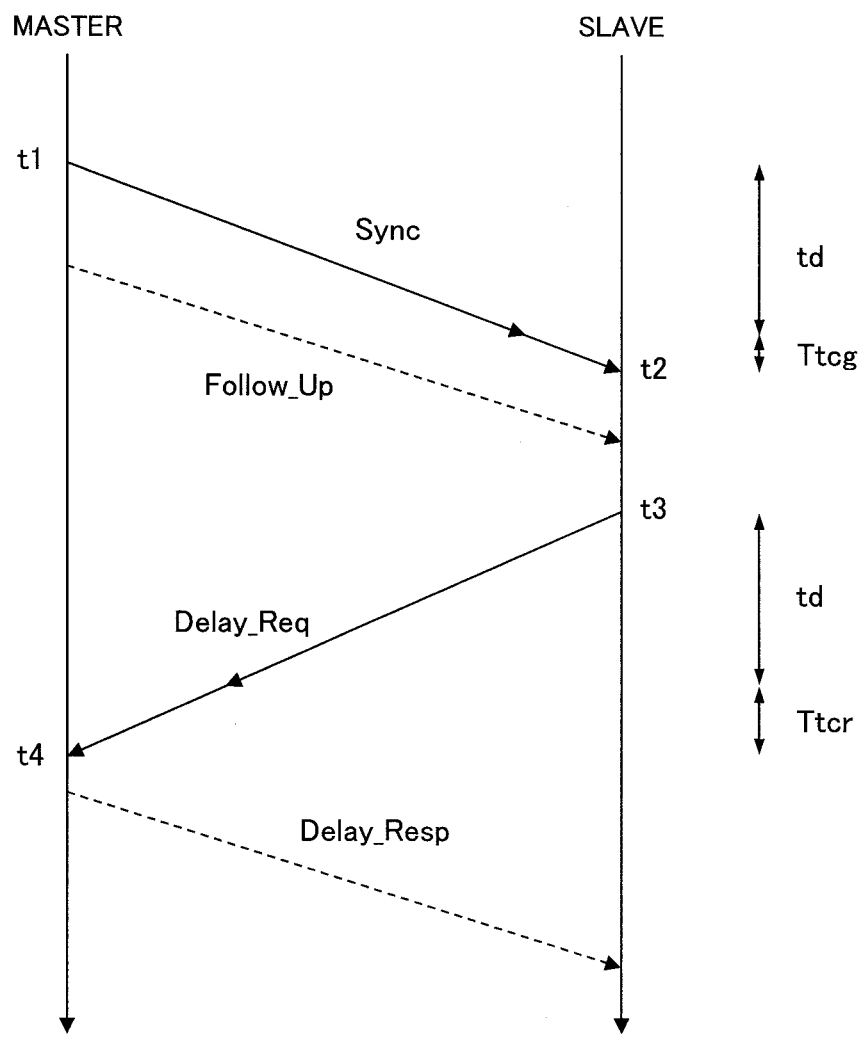
FIG. 24 shows exchanges of messages between a master and a slave.

FIG. 24 shows exchanges of messages between a master and a slave, and is the same as FIG. 15. However, FIG. 24 shows a communication delay Ttcg stored in a forward packet (Sync message), a communication delay Ttcr stored in a backward packet (Delay_Req message), and a one-way communication delay td.

The one-way communication delay td and time difference tdiff are expressed by Formula (12) and Formula (13) respectively by use of the times t1, t2, t3, and t4 shown also in FIG. 14 and FIG. 15.

$$td = ((t4-t1)-(t3-t2)-Ttcr-Ttcg)/2 \quad (12)$$

$$tdiff = ((t4-(Ttcr-Ttcg)+t1)-(t3+t2))/2 \quad (13)$$

At this time, the communication delay td does not contain a communication delay of the TC 220.

When there is no conflict at a multicast in transmitting the Sync message, (Ttcr−Ttcg) can be considered as a delay occurred by conflict within the TC 220.

At this time, the network-configuration information storage section 151 maintains network configuration information such as connection order of the TC 220, the network intermediary equipment 121, and the communication unit 123, and uses the information to determine the above-mentioned conflict of the packets.

Figure 23:
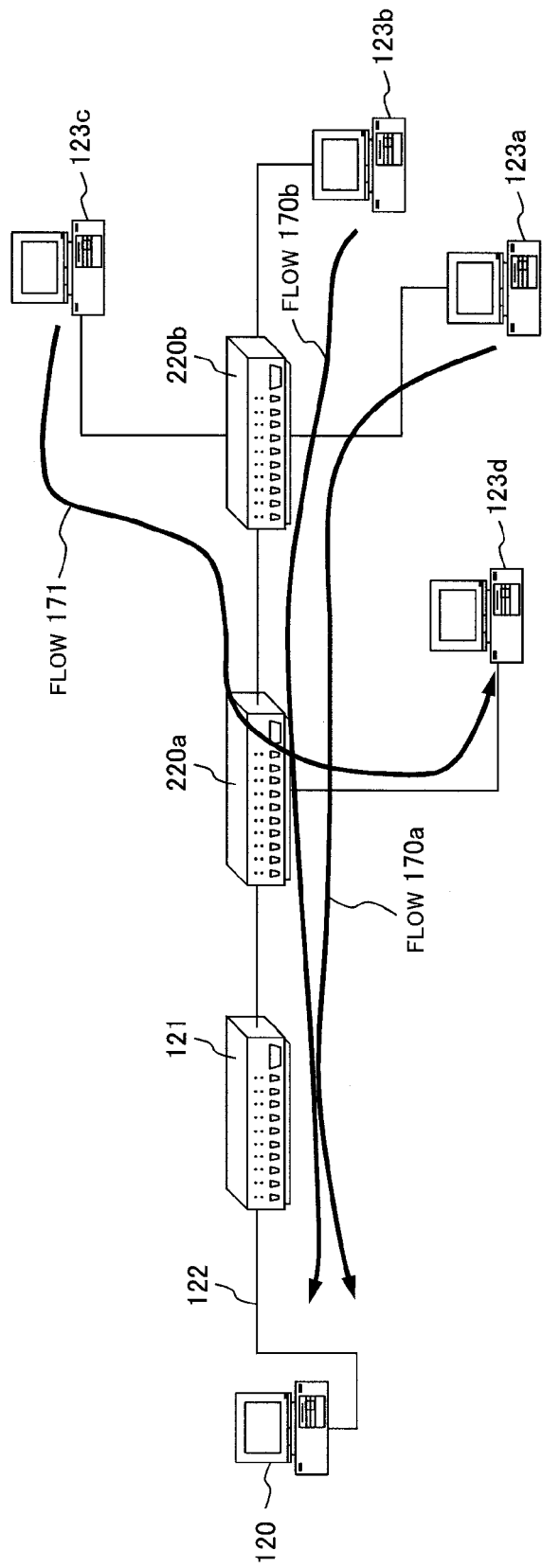
FIG. 23 shows an example wherein a communication flow which is unrelated to a time synchronization is present.

FIG. 23 shows an example of communication flows when a communication flow unrelated to the time synchronization is present. Two TCs (TC 220*a* and TC 220*b*) are present in FIG. 23. As shown in FIG. 23, communication flows 170*a* and 170*b* of time synchronization packets are present from the communication units 123*a* and 123*b* to the communication control equipment 120, respectively. The communication flow 171 unrelated to the time synchronization is present from the communication unit 123*c* to the communication unit 123*d*.

The packet of the communication flow 171 may conflict with the packet of the time synchronization flow 170*a* or 170*b* in the TC 220*a* or 220*b*. Since the communication control equipment 120 cannot detect the influence of the communication flow 171 on the time synchronization flow 170*a* or 170*b*, the time synchronization is typically difficult.

However, as shown in FIG. 23, the delay information in the TC 220*a* and TC 220*b* is storable in the time synchronization packets by providing the TC 220*a* and TC 220*b* in the portion into which the communication flow unrelated to the time synchronization flows. Therefore, it is not necessary to take the conflicts within the TC 220 into consideration. Only the conflicts within the network intermediary equipment 121 may be determined by the method described in the above embodiments.

Therefore, the communication control equipment 120 measures receiving intervals of the time synchronization packets of the communication flows 170*a* and 170*b*, and may continue the time synchronization protocol upon determination that there is no conflict. The communication units 123*a* and 123*b* may synchronize with the communication control equipment 120 by use of Formula (12) and Formula (13).

According to this embodiment, overheads due to the re-execution of the time synchronization processing can be reduced by using the TC. Since the TCs may be installed partially in the system, the number of the dedicated TCs installed may be small advantageously.

Embodiment 7

Embodiment 7 is such that a probability of conflict is reduced by changing the communication control equipment 120 used as a master of IEEE 1588. In IEEE 1588, one of pieces of communication control equipment configuring a distributed control system serves as a master (see S001 of FIG. 6). In this embodiment, instead of a piece of communication control equipment that serves as a master, another piece of communication control equipment serves as a master. In the figures used in Embodiment 7, since the same reference numerals as Embodiments 1 to 6 are the same as those of the functions, components, etc. explained in Embodiments 1 to 6 unless otherwise indicated, their explanation is omitted.

Figure 21:
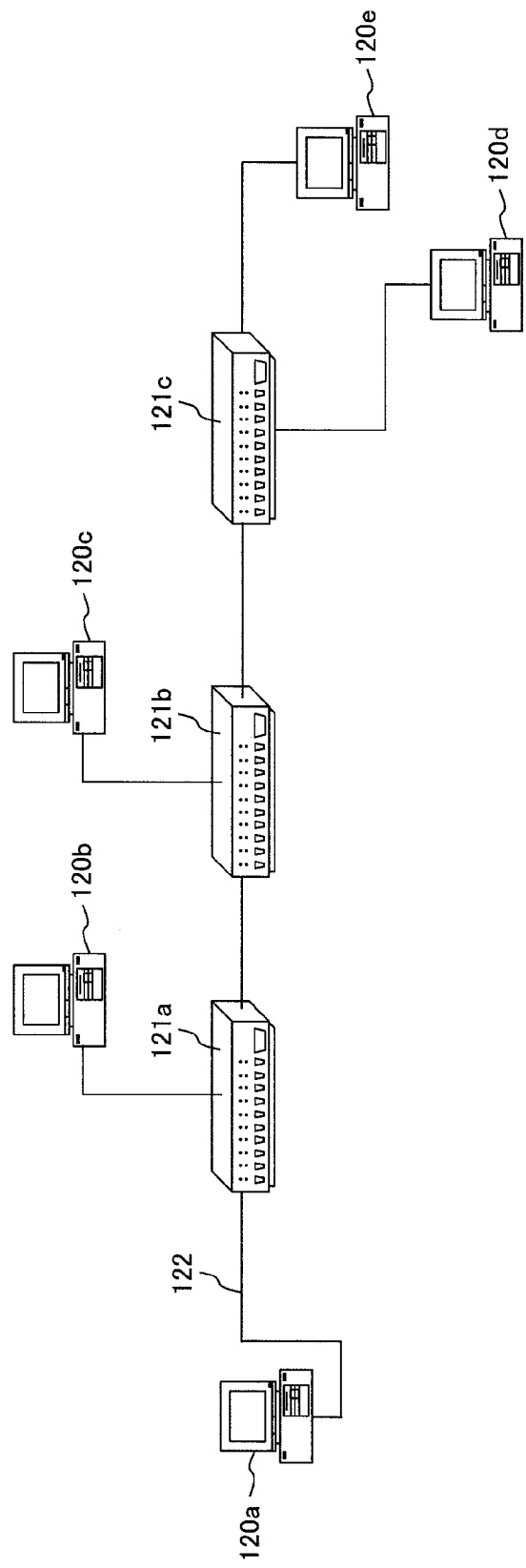
FIG. 21 shows a configuration of a distributed control system in Embodiment 7.

FIG. 21 shows a configuration of a distributed control system in this embodiment. In the system shown in FIG. 21, pieces of communication control equipment 120*a* to 120*e* are provided as equipment to execute the time synchronization protocol. Each piece of communication control equipment 120*a* to 120*e* has the configuration shown in FIG. 3 or 7, and connected via the network intermediary equipment 121*a*, 121*b*, and 121*c*. In this embodiment, the role of the master in IEEE 1588 is moved between the pieces of communication control equipment 120*a* to 120*e*. That is, the communication control equipment that is a master is made to be a slave, and one of the pieces of communication control equipment that are slaves is made to be a master. Not all the equipment connected to the distributed control system need to be the communication control equipment 120 (that is, all the equipment connected to the distributed control system do not need to have functions of the master).

A procedure of moving the master role from one communication control equipment to another is explained.

First, the communication control equipment 120*c* is the master, and the synchronization processing is executed in the procedure of FIG. 6. The number of network intermediary equipment to route each piece of communication control equipment 120*a*, 120*b*, 120*d*, and 120*e* (the number of the network intermediary equipment to the communication control equipment 120*c* that is the master) is two. Therefore, when the processing performances of the network intermediary equipment 121*a* to 121*c* are comparable and the conditions of the communication routes are comparable, four packets from the communication control equipment 120*a*, 120*b*, 120*d*, and 120*e* may conflict in the network intermediary equipment 121*b* when all the acknowledgement timings overlap.

In this embodiment, when the communication control equipment 120*c* detects this conflict, the master equipment is changed to the communication control equipment 120*a*. When the communication control equipment 120*a* becomes the master, the number of network intermediary equipment for routing (the number of network intermediary equipment to the communication control equipment 120*a* that is the master) is distributed among the remaining communication control equipment 120*b* to 120*e* that serve as the slaves. As a result, the probability of conflict of the packets can be reduced.

A method of changing the master may include a method of using a dedicated protocol that identifies at least the communication control equipment 120 after the change or a method of intentionally adjusting index values determined to determine the master among the communication control equipment 120*a* to 120*e* in a Best Master Clock (hereafter called "BMC") algorithm of IEEE 1588. In BMC, there are parameters definable by a user and useful. A method of exchanging the user definable parameters among the communication control equipment 120*a* to 120*e* by use of a dedicated protocol can be also used.

For example, a method of selecting a new master includes a method of setting and selecting indexes in the communication control equipment 120*a* to 120*e* to select one of the pieces of communication control equipment that has the highest index. The calculation of the indexes can use the number of network intermediary equipment among the communication control equipment 120*a* to 120*e*, communication delays, a communication band, or a precision of a clock. For example, a method of determining distributions of the number of network intermediary equipment among the communication control equipment 120*a* to 120*e* to select the communication control equipment having the largest distribution as the master is useful.

The master may be changed when the topology changes due to obstacles of a STP (Spanning Tree Protocol), a RSTP (Rapid Spanning Tree Protocol), a communication route, etc.

According to this embodiment, by changing the master, the overheads to re-execute the time synchronization can be reduced, and the time synchronization can be executed by the distributed control system using the network intermediary equipment.

The present invention is not limited to the above embodiments, but includes various modifications. For example, the above embodiments are explained in detail to understand the present invention easily, but are not limited to ones including all the explained components. It is possible to replace part of the configuration of one embodiment with that of another embodiment. It is also possible to add, to the configuration of one embodiment, the configuration of another embodiment. It is possible to execute addition, deletion, and replacement of another configuration to part of the configuration of each embodiment.

Part or all of the above configurations, functions, processing sections, processing means, etc. may be realized using hardware by designing part or all thereof, e.g., by use of an integrated circuit. The above configurations, functions, etc. may be realized using software by interpreting and executing a program that realizes each function by use of a processor. Programs to realize each function, tables, files, information such as measurement information and calculation information can be stored in a recording device such as a memory, a hard disk, and a SSD (solid state drive) or recording media such as an IC card, an SD card, and DVD.

The control lines and information lines required for the explanation are shown. All the control lines and information lines are not shown for products. Actually, it may be considered that generally all the components are connected to each other.

What is claimed is:

1. Communication control equipment, connected to a plurality of communication control equipment via a network compliant with a network standard, the network including at least one network intermediary equipment, and configured to be time-synchronized with the plurality of communication control equipment by using a time synchronization procedure using a communication including at least request packets and acknowledgement packets, comprising a processor and a transceiver, wherein the transceiver is configured to:
measure a receiving interval between a first request packet and a second request packet from the plurality of communication control equipment, wherein the second request packet is a synchronization request with a reception time measured by the communication control equipment; and
wherein the processor is configured to:
detect conflict of the request packets from any of the plurality of communication control equipment on a basis of the receiving interval of the request packets, wherein the processor determines that there is no conflict of the request packets when the receiving interval of the request packets measured by the transceiver is more than a receiving interval of the request packets calculated at least by using an inter-frame gap defined in the network standard; and
determine whether to transmit an acknowledgement packet to the communication control equipment that has transmitted the request packets based on the detected conflict.

2. The communication control equipment according to claim 1, wherein, when the processor determines that there is no conflict of the request packets, the communication control equipment transmits the acknowledgement packet to the communication control equipment that has transmitted these request packets.

3. The communication control equipment according to claim 1, wherein, when the processor detects the conflict of the request packets, the communication control equipment transmits a re-request packet for requesting a time synchronization to the communication control equipment that has transmitted these request packets of the plurality of communication control equipment.

4. The communication control equipment according to claim 3, wherein the communication control equipment that has transmitted the request packets of the plurality of communication control equipment communicates with other communication control equipment within a predetermined time after receiving the re-request packet for requesting the time synchronization.

5. The communication control equipment according to claim 1, wherein, when the communication control equipment does not receive the request packets within a predetermined time, the communication control equipment transmits a re-request packet for requesting a time synchronization to the plurality of communication control equipment.

6. The communication control equipment according to claim 1, wherein, when the processor detects the conflict of the request packets, the communication control equipment transmits a re-request packet for requesting a time synchronization at least to the communication control equipment that has transmitted these request packets.

7. The communication control equipment according to claim 1, wherein the processor determines that the request packets has conflicted when a time span exceeds a predetermined time, the time span being a time until the communication control equipment first receives the request packets from the plurality of communication control equipment after the transceiver transmits a re-request packet for requesting a time synchronization to the plurality of communication control equipment.

8. The communication control equipment according to claim 1, wherein the communication control equipment changes a time span until the communication control equipment transmits a re-request packet for requesting a time synchronization, according to the number of conflicts of the request packets detected b.

9. The communication control equipment according to claim 1, wherein the processor is configured to divide the plurality of communication control equipment into groups, wherein the communication control equipment is configured to determine whether to transmit request packets to the divided groups, based on the detected conflict.

10. The communication control equipment according to claim 9, wherein the processor is configured to divide the plurality of communication control equipment into groups based on communication delays with the plurality of communication control equipment.

11. The communication control equipment according to claim 9, wherein the processor is configured to divide the plurality of communication control equipment into groups based on any one or more of the number of transmissions of acknowledgement packets, the number of success time synchronizations with the plurality of communication control equipment, the number of failure time synchronizations with the plurality of communication control equipment, and an elapsed time after completion of the time-synchronizations with the plurality of communication control equipment.

12. The communication control equipment according to claim 9, further comprising a memory configured to store configuration information of the network, wherein the processor is configured to divide the plurality of communication control equipment into groups based on the configuration information of the network stored by the memory.

13. communication control equipment according to claim 12, wherein the configuration information of the network stored by the memory includes one or more of the number of the equipment included in the network, information on the equipment, a network topology, the number of hops to the equipment, communication delays to the equipment, a performance of intermediary equipment included in the network, a communication performance of the network, and network media.

14. The communication control equipment according to claim 9, wherein the processor is configured to divide the plurality of communication control equipment into groups based on a transmission history of acknowledgement packets to the plurality of communication control equipment.

15. The communication control equipment according to claim 9, wherein, when the number of the plurality of communication control equipment that has failed to be time-synchronized is equal to or less than a predetermined number, the processor divides the plurality of communication control equipment into groups by selecting a predetermined number of communication control equipment from the plurality of communication control equipment that has failed to be time-synchronized.

16. The communication control equipment according to claim 1, wherein the communication control equipment is included in a network configuration employing network intermediary equipment configured to store a staying time of a packet within the network intermediary equipment into the packet, wherein the transceiver consecutively receives first request packets transmitted from a first communication control equipment and second request packets transmitted from a second communication control equipment via the network intermediary equipment, and wherein the processor determines that there is no conflict of the second request packets when the processor determines that the first communication control equipment and the second communication control equipment do not share a communication route to the network intermediary equipment and that there is no conflict of the first request packets.

17. A communication control equipment comprising a processor to execute software for time synchronization with a plurality of communication control equipment connected to the communication control equipment via a network intermediary equipment compliant with a network standard, the software stored on a memory, wherein the processor is configured to:

measure a receiving interval between a first request packet and a second request packet from the plurality of communication control equipment, wherein the second request packet is a synchronization request with a reception time measured by the communication control equipment;

detect conflict of the request packets from any of the plurality of communication control equipment on a basis of the receiving interval of the request packets measured by the receiving-interval measurement section, wherein the processor determines that there is no conflict of the request packets when the receiving interval of the request packets measured by the transceiver is more than a receiving interval of the request packets calculated at least by using an inter-frame gap defined in the network standard; and determine whether to transmit an acknowledgement packet to the communication control equipment that has transmitted the request packets based on the detected conflict.

* * * * *